(12) United States Patent
Jang et al.

(10) Patent No.: US 12,401,783 B2
(45) Date of Patent: Aug. 26, 2025

(54) METHOD AND DEVICE FOR IMAGE ENCODING/DECODING BASED ON LAYER INDEX OF ILRP, AND RECORDING MEDIUM FOR STORING BITSTREAM

(71) Applicant: LG ELECTRONICS INC., Seoul (KR)

(72) Inventors: Hyeong Moon Jang, Seoul (KR); Hendry Hendry, Seoul (KR); Jung Hak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 17/926,859

(22) PCT Filed: May 21, 2021

(86) PCT No.: PCT/KR2021/006324
§ 371 (c)(1),
(2) Date: Apr. 20, 2023

(87) PCT Pub. No.: WO2021/235882
PCT Pub. Date: Nov. 25, 2021

(65) Prior Publication Data
US 2023/0254476 A1 Aug. 10, 2023

Related U.S. Application Data

(60) Provisional application No. 63/028,579, filed on May 22, 2020.

(51) Int. Cl.
*H04N 19/105* (2014.01)
*H04N 19/159* (2014.01)
*H04N 19/172* (2014.01)

(52) U.S. Cl.
CPC ......... *H04N 19/105* (2014.11); *H04N 19/159* (2014.11); *H04N 19/172* (2014.11)

(58) Field of Classification Search
CPC .. H04N 19/105; H04N 19/159; H04N 19/172; H04N 19/187; H04N 19/30; H04N 19/70
See application file for complete search history.

(56) References Cited

U.S. PATENT DOCUMENTS 9,756,335 B2 * 9/2017 Chen ....................... H04N 19/70
9,774,927 B2 * 9/2017 Rusert .................... H04N 19/30
(Continued)

FOREIGN PATENT DOCUMENTS

KR 1020150095625 A 8/2015

OTHER PUBLICATIONS

Byeongdoo Choi, et al., "AHG8: On signaling interlayer reference picture list", Joint Video Experts Team (JVET) of ITU-T SG 16 WP 3 and ISO/IEC JTC 1/SC 29/WG 11, 16th Meeting: Geneva, CH, Oct. 1-11, 2019. JVET-P0221-v2.
(Continued)

*Primary Examiner* — Boubacar Abdou Tchoussou
(74) *Attorney, Agent, or Firm* — Bryan Cave Leighton Paisner LLP

(57) ABSTRACT

An image encoding/decoding method and apparatus are provided. An image decoding method comprises determining whether a current entry in a reference picture list structure is an inter-layer reference picture (ILRP) entry, determining whether a current layer including a current picture has a plurality of direct reference layers, based on the current entry being the ILRP entry, acquiring a layer index of the current entry for a direct reference layer list from a bitstream, based on the current layer having a plurality of direct reference layers, and determining a direct reference layer including the current entry based on the layer index.

(Continued)

The obtaining of the layer index may be skipped based on the current layer not having a plurality of direct reference layers.

14 Claims, 12 Drawing Sheets

(56) References Cited

U.S. PATENT DOCUMENTS 11,533,472 B2 * 12/2022 Chen .................... H04N 19/423
2018/0115780 A1    4/2018 Yamamoto et al.

OTHER PUBLICATIONS

Benjamin Bross, et al., "Versatile Video Coding (Draft 8)", oint Video Experts Team (JVET ) of ITU-T SG 16 WP 3 and ISO/IEC JTC 1/SC 29/WG 11, 17th Meeting: Brussels, BE, Jan. 7-17, 2020. Document: JVET-Q2001-vE.
Chen-Yen Lai, et al., "AHG8: Temporal sublayer requirements for multi-layer referencing", Joint Video Experts Team (JVET) of ITU-T SG 16 WP 3 and ISO/IEC JTC 1/SC 29/WG 11, 18th Meeting: by teleconference, Apr. 15-24, 2020. JVET-R0046-v3v4.

* cited by examiner

FIG. 8

| ref_pic_lists( ) { | Descriptor |
|---|---|
|   for( i = 0; i < 2; i++ ) { | |
|     if( sps_num_ref_pic_lists[ i ] > 0 && | |
|         ( i == 0 \|\| ( i == 1 && pps_rpl1_idx_present_flag ) ) ) | |
|       rpl_sps_flag[ i ] | u(1) |
|     if( rpl_sps_flag[ i ] ) { | |
|       if( sps_num_ref_pic_lists[ i ] > 1 && | |
|           ( i == 0 \|\| ( i == 1 && pps_rpl1_idx_present_flag ) ) ) | |
|         rpl_idx[ i ] | u(v) |
|     } else | |
|       ref_pic_list_struct( i, sps_num_ref_pic_lists[ i ] ) | |
|     for( j = 0; j < NumLtrpEntries[ i ][ RplsIdx[ i ] ]; j++ ) { | |
|       if( ltrp_in_header_flag[ i ][ RplsIdx[ i ] ] ) | |
|         poc_lsb_lt[ i ][ j ] | u(v) |
|       delta_poc_msb_cycle_present_flag[ i ][ j ] | u(1) |
|       if( delta_poc_msb_cycle_present_flag[ i ][ j ] ) | |
|         delta_poc_msb_cycle_lt[ i ][ j ] | ue(v) |
|     } | |
|   } | |
| } | |

FIG. 9

| ref_pic_list_struct( listIdx, rplsIdx ) { | Descriptor |
|---|---|
|   num_ref_entries[ listIdx ][ rplsIdx ] | ue(v) |
|   if( sps_long_term_ref_pics_flag && rplsIdx < sps_num_ref_pic_lists[ listIdx ] ) | |
|     ltrp_in_header_flag[ listIdx ][ rplsIdx ] | u(1) |
|   for( i = 0, j = 0; i < num_ref_entries[ listIdx ][ rplsIdx ]; i++) { | |
|     if( sps_inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( sps_long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_header_flag[ listIdx ][ rplsIdx ] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|   } | |
| } | |

FIG. 10

| ref_pic_list_struct( listIdx, rplsIdx ) { | Descriptor |
|---|---|
|    num_ref_entries[ listIdx ][ rplsIdx ] | ue(v) |
|    if( sps_long_term_ref_pics_flag && rplsIdx < sps_num_ref_pic_lists[ listIdx ] ) | |
|      ltrp_in_header_flag[ listIdx ][ rplsIdx ] | u(1) |
|    for( i = 0, j = 0; i < num_ref_entries[ listIdx ][ rplsIdx ]; i++) { | |
|      if( sps_inter_layer_ref_pics_present_flag ) | |
|        inter_layer_ref_pic_flag[ listIdx ][ rplsIdx ][ i ] | u(1) |
|      if( !inter_layer_ref_pic_flag[ listIdx ][ rplsIdx ][ i ] ) { | |
|        ... | |
|      } else if( NumDirectRefLayers[ GeneralLayerIdx[ nuh_layer_id ] ] > 1 ) | |
|        ilrp_idx[ listIdx ][ rplsIdx ][ i ] | ue(v) |
|    } | |
| } | |

FIG. 11

| ref_pic_list_struct( listIdx, rplsIdx ) { | Descriptor |
|---|---|
|    num_ref_entries[ listIdx ][ rplsIdx ] | ue(v) |
|    if( sps_long_term_ref_pics_flag && rplsIdx < sps_num_ref_pic_lists[ listIdx ] ) | |
|      ltrp_in_header_flag[ listIdx ][ rplsIdx ] | u(1) |
|    for( i = 0, j = 0; i < num_ref_entries[ listIdx ][ rplsIdx ]; i++) { | |
|      if( sps_inter_layer_ref_pics_present_flag ) | |
|        inter_layer_ref_pic_flag[ listIdx ][ rplsIdx ][ i ] | u(1) |
|      if( !inter_layer_ref_pic_flag[ listIdx ][ rplsIdx ][ i ] ) { | |
|        ... | |
|      } else if( rplsIdx < sps_num_ref_pic_lists[ listIdx ] \|\| | |
|        NumDirectRefLayers[ GeneralLayerIdx[ nuh_layer_id ] ] > 1 ) | |
|        ilrp_idx[ listIdx ][ rplsIdx ][ i ] | ue(v) |
|    } | |
| } | |

FIG. 12

| seq_parameter_set_rbsp( ) { | Descriptor |
|---|---|
|    ... | |
|    sps_long_term_ref_pics_flag | u(1) |
|    if( sps_video_parameter_set_id > 0 ) | |
|      sps_inter_layer_ref_pics_present_flag | u(1) |
|    if( sps_inter_layer_ref_pics_present_flag ) | |
|      sps_num_direct_reference_layers_minus1 | ue(v1) |
|    ... | |
| } | |

FIG. 13

| ref_pic_list_struct( listIdx, rplsIdx ) { | Descriptor |
|---|---|
|   num_ref_entries[ listIdx ][ rplsIdx ] | ue(v) |
|   if( sps_long_term_ref_pics_flag && rplsIdx < sps_num_ref_pic_lists[ listIdx ] ) | |
|     ltrp_in_header_flag[ listIdx ][ rplsIdx ] | u(1) |
|   for( i = 0, j = 0; i < num_ref_entries[ listIdx ][ rplsIdx ]; i++) { | |
|     if( sps_inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       ... | |
|     } else if( sps_num_direct_reference_layers_minus1 > 0 ) | |
|       ilrp_idx[ listIdx ][ rplsIdx ][ i ] | ue(v) |
|   } | |
| } | |

FIG. 14

| seq_parameter_set_rbsp( ) { | Descriptor |
|---|---|
|   ... | |
|   if( sps_video_parameter_set_id > 0 ) | |
|     sps_inter_layer_ref_pics_present_flag | u(1) |
|   if( sps_inter_layer_ref_pics_present_flag ) | |
|     sps_ref_layer_idx_plus1 | ue(v) |
|   ... | |
| } | |

FIG. 15

| ref_pic_list_struct( listIdx, rplsIdx ) { | Descriptor |
|---|---|
|   num_ref_entries[ listIdx ][ rplsIdx ] | ue(v) |
|   if( sps_long_term_ref_pics_flag && rplsIdx < sps_num_ref_pic_lists[ listIdx ] ) | |
|     ltrp_in_header_flag[ listIdx ][ rplsIdx ] | u(1) |
|   for( i = 0, j = 0; i < num_ref_entries[ listIdx ][ rplsIdx ]; i++) { | |
|     if( sps_inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       ... | |
|     } else if( sps_ref_layer_idx_plus1 == 0 ) | |
|       ilrp_idx[ listIdx ][ rplsIdx ][ i ] | ue(v) |
|   } | |
| } | |

METHOD AND DEVICE FOR IMAGE ENCODING/DECODING BASED ON LAYER INDEX OF ILRP, AND RECORDING MEDIUM FOR STORING BITSTREAM

CROSS-REFERENCE TO RELATED APPLICATION

This application is the National Stage filing under 35 U.S.C. 371 of International Application No. PCT/KR2021/006324, filed May 21, 2021, which claims priority to and the benefit of U.S. Provisional Application No. 63/028,579, filed on May 22, 2020, the disclosure of which is incorporated herein by reference in its entirety.

TECHNICAL FIELD

The present disclosure relates to an image encoding/decoding method and apparatus and a recording medium storing a bitstream, and, more particularly, to an image encoding and decoding method and apparatus based on a layer index of an ILRP, and a recording medium storing a bitstream generated by the image encoding method/apparatus of the present disclosure.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

Another object of the present disclosure is to provide an image encoding/decoding method and apparatus for signaling a layer index of an ILRP based on the number of direct reference layers.

Another object of the present disclosure is to provide an image encoding/decoding method and apparatus for signaling a layer index of an ILRP based on whether a reference picture list structure is present in an SPS.

Another object of the present disclosure is to provide an image encoding/decoding method and apparatus for signaling a layer index of an ILRP based on a syntax element in an SPS regarding the number of direct reference layers.

Another object of the present disclosure is to provide a non-transitory recording medium storing a bitstream generated by an image encoding method or apparatus according to the present disclosure.

Another object of the present disclosure is to provide a non-transitory recording medium storing a bitstream received, decoded and used to reconstruct an image by an image decoding apparatus according to the present disclosure.

Another object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

An image decoding method performed by an image decoding apparatus according to an aspect of the present disclosure comprises determining whether a current entry in a reference picture list structure is an inter-layer reference picture (ILRP) entry, determining whether a current layer including a current picture has a plurality of direct reference layers, based on the current entry being the ILRP entry, acquiring a layer index of the current entry for a direct reference layer list from a bitstream, based on the current layer having a plurality of direct reference layers, and determining a direct reference layer including the current entry based on the layer index. The obtaining of the layer index may be skipped based on the current layer not having a plurality of direct reference layers.

An image decoding apparatus according to another aspect of the present disclosure comprises a memory and at least one processor. The at least one processor may determine whether a current entry in a reference picture list structure is an inter-layer reference picture (ILRP) entry, determine whether a current layer including a current picture has a plurality of direct reference layers, based on the current entry being the ILRP entry, acquire a layer index of the current entry for a direct reference layer list from a bitstream, based on the current layer having a plurality of direct reference layers, and determine a direct reference layer including the current entry based on the layer index. The obtaining of the layer index may be skipped based on the current layer not having a plurality of direct reference layers.

An image encoding method according to another aspect of the present disclosure comprises determining whether a current entry in a reference picture list structure is an inter-layer reference picture (ILRP) entry, determining whether a current layer including a current picture has a plurality of direct reference layers, based on the current entry being the ILRP entry, and encoding a layer index of the current entry for a direct reference layer list, based on the current layer having a plurality of direct reference layers. Encoding of the layer index may be skipped based on the current layer not having a plurality of direct reference layers.

Also, a computer-readable recording medium according to another aspect of the present disclosure may store a bitstream generated by an image encoding method or apparatus according to the present disclosure.

Also, a transmission method according to another aspect of the present disclosure may transmit a bitstream generated by an image encoding apparatus or method according to the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

According to the present disclosure, it is possible to provide an image encoding/decoding method and apparatus for signaling a layer index of an ILRP based on the number of direct reference layers.

According to the present disclosure, it is possible to provide an image encoding/decoding method and apparatus for signaling a layer index of an ILRP based on whether a reference picture list structure is present in an SPS.

According to the present disclosure, it is possible to provide an image encoding/decoding method and apparatus for signaling a layer index of an ILRP based on a syntax element in an SPS regarding the number of direct reference layers.

Also, according to the present disclosure, it is possible to provide a non-transitory recording medium storing a bitstream generated by an image encoding method or apparatus according to the present disclosure.

Also, according to the present disclosure, it is possible to provide a non-transitory recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 8 is a diagram illustrating ref_pic_lists( ) syntax.

FIG. 9 is a diagram illustrating ref_pic_list_struct(listIdx, rplsIdx) syntax.

FIG. 10 is a diagram illustrating ref_pic_list_struct(listIdx, rplsIdx) syntax according to an embodiment of the present disclosure.

FIG. 11 is a diagram illustrating ref_pic_list_struct(listIdx, rplsIdx) syntax according to an embodiment of the present disclosure.

FIG. 12 is a diagram illustrating SPS syntax according to an embodiment of the present disclosure.

FIG. 13 is a diagram illustrating ref_pic_list_struct(listIdx, rplsIdx) syntax according to an embodiment of the present disclosure.

FIG. 14 is a diagram illustrating SPS syntax according to an embodiment of the present disclosure.

FIG. 15 is a diagram illustrating ref_pic_list_struct(listIdx, rplsIdx) syntax according to an embodiment of the present disclosure.

DETAILED DESCRIPTION

Figure 1:
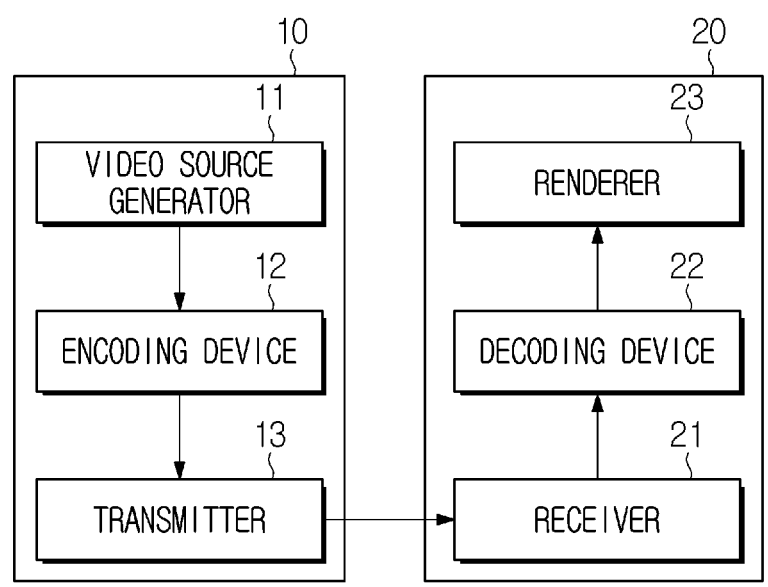
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system to which an embodiment of the present disclosure is applicable.

The video coding system according to an embodiment may include an encoding device 10 and a decoding device 20. The encoding device 10 may deliver encoded video and/or image information or data to the decoding device 20 in the form of a file or streaming via a digital storage medium or network.

The encoding device 10 according to an embodiment may include a video source generator 11, an encoding unit 12 and a transmitter 13. The decoding device 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be di splayed through the display.

Overview of Image Encoding Apparatus

Figure 2:
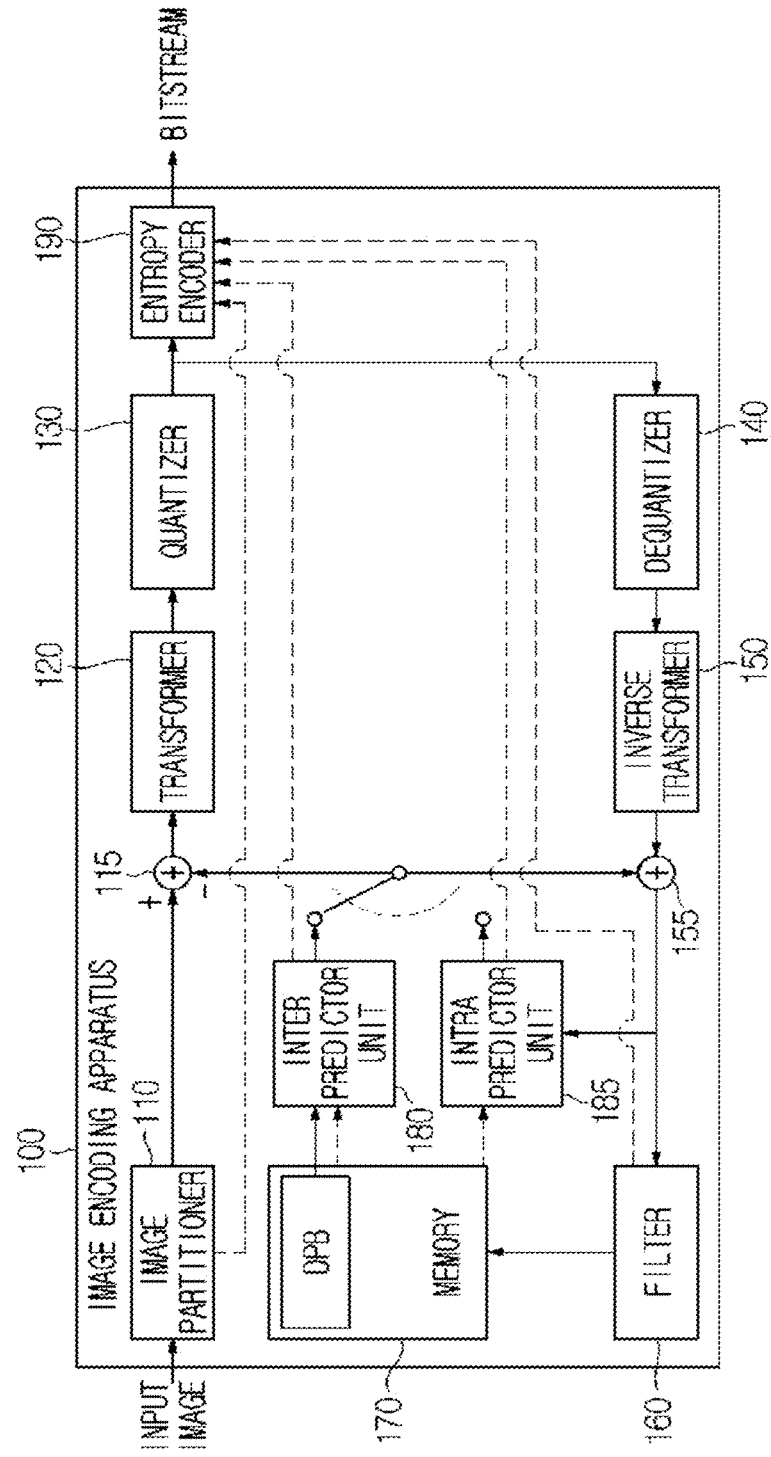
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image source device 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image source device 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image source device 100 into one or more processing units. For example, the processing unit may be called a coding unit (CU). The coding unit may be obtained by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth obtained by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS).

In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image source device 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image source device 100, prediction mismatch between the image source device 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
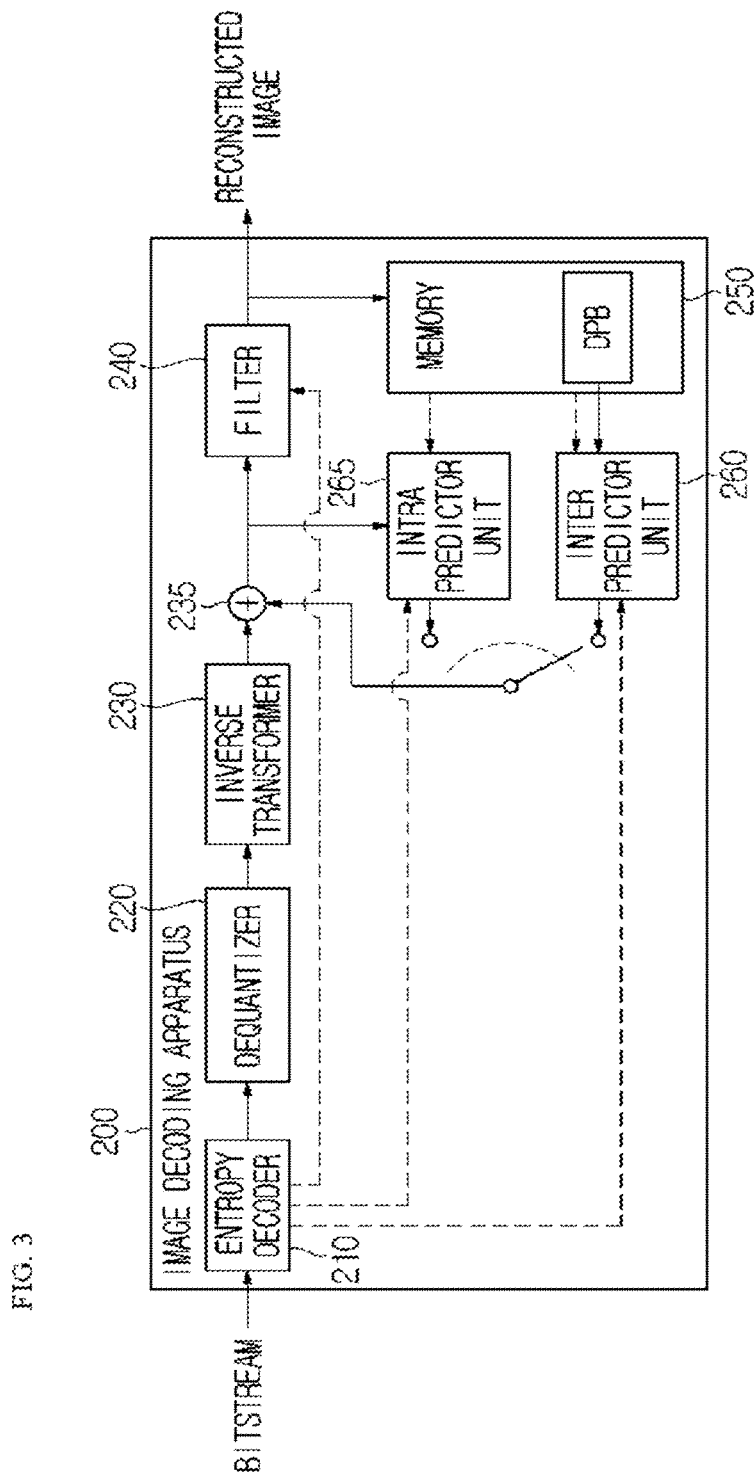
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image reception device 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image reception device 200 may be configured by a hardware component (e.g., a decoder or a processor) according to an embodiment. In addition, the memory 250 may include a decoded picture buffer (DPB) or may be configured by a digital storage medium.

The image reception device 200, which has received a bitstream including video/image information, may reconstruct an image by performing a process corresponding to a process performed by the image source device 100 of FIG. 2. For example, the image reception device 200 may perform decoding using a processing unit applied in the image encoding apparatus. Thus, the processing unit of decoding may be a coding unit, for example. The coding unit may be obtained by partitioning a coding tree unit or a largest coding unit. The reconstructed image signal decoded and output through the image reception device 200 may be reproduced through a reproducing apparatus (not shown).

The image reception device 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image reception device 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image source device 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image source device 100 may be equally or correspondingly applied to the filter 240, the inter predictor 260, and the intra predictor 265 of the image reception device 200.

Multi-Layer Based Coding

Image/video coding according to the present disclosure may include multi-layer based image/video coding. The multi-layer based image/video coding may include scalable coding. In multi-layer based coding or scalable coding, input signals may be processed for each layer. According to the layer, input signals (input images/videos) may have different values in terms of at least one of resolution, frame rate, bit-depth, color format, aspect ratio or view. In this case, it is possible to reduce redundant information transmission/processing and to increase compression efficiency, by performing inter-layer prediction using a difference between layers (e.g., based on scalability).

Figure 4:
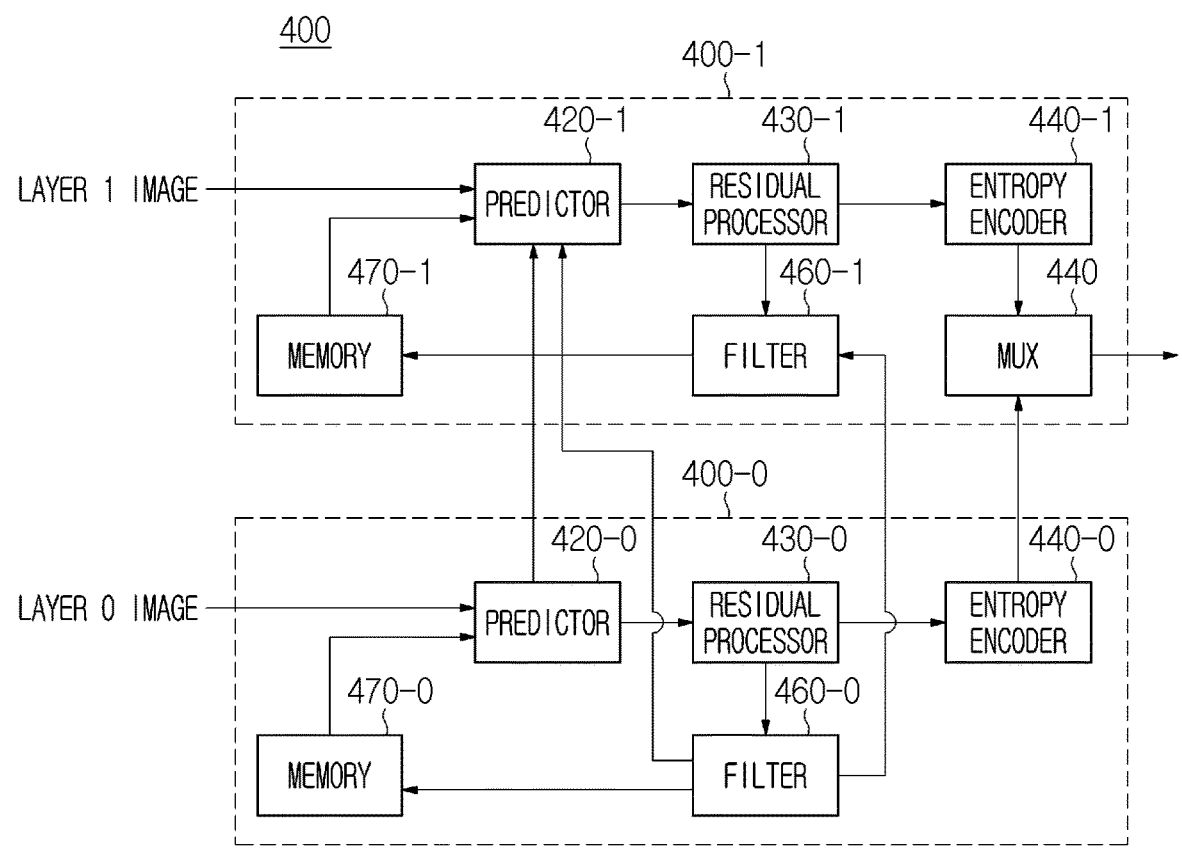
FIG. 4 is a schematic block diagram of a multi-layer encoding apparatus, to which embodiment(s) of the present disclosure is applicable, and, in which encoding of a multi-layer video/image signal is performed.

FIG. 4 is a schematic block diagram of a multi-layer encoding apparatus, to which embodiment(s) of the present disclosure is applicable, and, in which encoding of a multi-layer video/image signal is performed.

The multi-layer encoding apparatus 400 of FIG. 4 may include the encoding apparatus of FIG. 2. Compared to FIG. 2, the image partitioner 110 and the adder 155 are not shown in the multi-layer encoding apparatus 400 of FIG. 4, the multi-layer encoding apparatus 400 may include the image partitioner 110 and the adder 155. In an embodiment, the image partitioner 110 and the adder 155 may be included in unit of layer. Hereinafter, multi-layer based prediction will be focused upon in the description of FIG. 4. For example, in addition to the following description, the multi-layer encoding apparatus 400 may include the technical idea of the encoding apparatus described above with reference to FIG. 2.

For convenience of description, a multi-layer structure consisting of two layers is shown in FIG. 4. However, the embodiments of the present disclosure are not limited to two layers and the multi-layer structure, to which the embodiment of the present disclosure is applied, may include two or more layers.

Referring to FIG. 4, the encoding apparatus 400 includes an encoder 400-1 of layer 1 and an encoder 400-0 of layer 0. Layer 0 may be a base layer, a reference layer or a lower layer, and layer 1 may be an enhancement layer, a current layer or a higher layer.

The encoder 400-1 of layer 1 may include a predictor 420-1, a residual processor 430-1, a filter 460-1, a memory 470-1, an entropy encoder 440-1 and a multiplexer (MUX) 440. In an embodiment, the MUX 440 may be included as an external component.

The encoder 400-0 of layer 0 may include a predictor 420-0, a residual processor 430-0, a filter 460-0, a memory 470-0 and an entropy encoder 440-0.

The predictors 420-0 and 420-1 may perform prediction with respect to input images based on various prediction schemes as described above. For example, the predictors 420-0 and 420-1 may perform inter prediction and intra prediction. The predictors 420-0 and 420-1 may perform prediction in a predetermined processing unit. The prediction unit may be a coding unit (CU) or a transform unit (TU). A predicted block (including prediction samples) may be generated according to the result of prediction and, based on this, the residual processor may derive a residual block (including residual samples).

Through inter prediction, prediction may be performed based on information on at least one of a previous picture and/or a next picture of a current picture, thereby generating a prediction block. Through intra prediction, prediction may be performed based on neighboring samples in a current picture, thereby generating a prediction block.

As an inter prediction mode or method, the above-described various prediction modes or methods may be used. In inter prediction, a reference picture may be selected for a current block to be predicted, and a reference block corresponding to the current block may be selected from the reference picture. The predictors 420-0 and 420-1 may generate a predicted block based on the reference block.

In addition, the predictor 420-1 may perform prediction for layer 1 using information on layer 0. In the present disclosure, a method of predicting information on a current layer using information on another layer is referred to as inter-layer prediction, for convenience of description.

Information on a current layer predicted using information on another layer (that is, predicted by inter-layer prediction) may be at least one of texture, motion information, unit information or a predetermined parameter (e.g., a filtering parameter, etc.).

In addition, information on another layer used for prediction of the current layer (that is, used for inter-layer prediction) may be at least one of texture, motion information, unit information or a predetermined parameter (e.g., a filtering parameter, etc.).

Inter-layer prediction, a current block may be a block in a current picture in a current layer (e.g., layer 1) and may be a block to be coded. A reference block is a block in a picture (reference picture) belonging to the same access unit (AU) as a picture (current picture), to which the current block belongs, on a layer (reference layer, e.g., layer 0) referred to for prediction of the current block, and may be a block corresponding to the current block.

As an example of inter-layer prediction, there is inter-layer motion prediction for predicting motion information of a current layer using motion information of a reference layer. According to inter-layer motion prediction, motion information of a current block may be predicted using motion information of a reference block. That is, in deriving motion information according to the inter prediction mode which will be described below, a motion information candidate may be derived based on motion information of an inter-layer reference block instead of a temporal neighboring block.

When inter-layer motion prediction is applied, the predictor 420-1 may scale and use reference block (that is, inter-layer reference block) motion information of the reference layer.

As another example of inter-layer prediction, inter-layer texture prediction may use texture of a reconstructed reference block as a prediction value for a current block. In this case, the predictor 420-1 may scale the texture of the reference block by up-scaling. Inter-layer texture prediction may be referred to as inter-layer (reconstructed) sample prediction or simply inter-layer prediction.

In inter-layer parameter prediction which is another example of inter-layer prediction, a derived parameter of a reference layer may be reused in a current layer or a parameter for a current layer may be derived based on a parameter used in a reference layer.

In inter-layer residual prediction which is another example of inter-layer prediction, residual information of a current layer may be predicted using residual information of another layer and, based on this, prediction of a current block may be performed.

In inter-layer difference prediction which is another example of inter-layer prediction, prediction of a current block may be performed using a difference between images obtained by up-sampling or down-sampling a reconstructed picture of a current layer and a reconstructed picture of a reference layer.

In inter-layer syntax prediction which is another example of inter-layer prediction, texture of a current block may be predicted or generated using syntax information of a reference layer. In this case, syntax information of a referenced reference layer may include information on an intra prediction mode and motion information.

A plurality of prediction methods using the above-described inter-layer may be used when predicting a particular block.

Here, as an example of inter-layer prediction, although inter-layer texture prediction, inter-layer motion prediction, inter-layer unit information prediction, inter-layer parameter prediction, inter-layer residual prediction, inter-layer difference prediction, inter-layer syntax prediction, etc. are described, inter-layer prediction applicable in the present disclosure is not limited thereto.

For example, inter-layer prediction may be applied as an extension of inter prediction for a current layer. That is, by including a reference picture derived from a reference layer in reference pictures capable of being referenced for inter prediction of a current block, it is possible to perform inter prediction for the current block.

In this case, the inter-layer reference picture may be included in a reference picture list for the current block. The predictor 420-1 may perform inter prediction for the current block using an inter-layer reference picture.

Here, the inter-layer reference picture may be a reference picture constructed by sampling the reconstructed picture of a reference layer to correspond to the current layer. Accordingly, when the reconstructed picture of the reference layer corresponds to the picture of the current layer, the reconstructed picture of the reference layer may be used as an inter-layer reference picture without sampling. For example, when the widths and heights of samples are the same in the reconstructed picture of the reference layer and the reconstructed picture of the current layer and an offset between the top left end, top right end, bottom left end and bottom right end in the picture of the reference layer and the top left end, top right end, bottom left end and bottom right end in the picture of the current layer is 0, the reconstructed picture of the reference layer may be used as the inter-layer reference picture of the current layer without being sampled again.

In addition, the reconstructed picture of the reference layer, from which the inter-layer reference picture is derived, may be a picture belonging to the same AU as the current picture to be encoded.

When inter prediction for a current block is performed by including an inter-layer reference picture in a reference picture list, the position of the inter-layer reference picture in the reference picture list may be different between reference picture lists L0 and L1. For example, in reference picture list L0, the inter-layer reference picture may be located after short-term reference pictures before the current picture and, in reference picture list L1, the inter-layer reference picture may be located at the end of the reference picture list.

Here, reference picture list L0 is a reference picture list used for inter prediction of P slice or a reference picture list used as a first reference picture list in inter prediction of B slice. Reference picture list L1 may be a second reference picture list used for inter prediction of B slice.

Accordingly, reference picture list L0 may consist of short-term reference picture(s) before the current picture, an inter-layer reference picture, short-term reference picture(s) after the current picture and a long-term reference picture in this order. Reference picture list L1 may consist of short-term reference picture(s) after the current picture, short-term reference picture(s) before the current picture, a long-term reference picture and an inter-layer reference picture in this order.

In this case, a predictive (P) slice is a slice for which intra prediction is performed or inter prediction is performed using a maximum of one motion vector per prediction block and a reference picture index. A bi-predictive (B) slice is a slice for which intra prediction is performed or prediction is performed using a maximum of two motion vectors per prediction block and a reference picture index. In this regard, an intra (I) slice is a slice to which only intra prediction is applied.

In addition, when inter prediction for a current block is performed based on a reference picture list including an inter-layer reference picture, the reference picture list may include a plurality of inter-layer reference pictures derived from a plurality of layers.

When a plurality of inter-layer reference pictures is included, the inter-layer reference pictures may be alternately arranged in reference picture lists L0 and L1. For example, assume that two inter-layer reference pictures such as inter-layer reference picture ILRPi and inter-layer reference picture ILRPj are included in the reference picture list used for inter prediction of the current block. In this case, in reference picture list L0, ILRPi may be located after short-term reference pictures before the current picture and ILRPj may be located at the end of the list. In addition, in reference picture list L1, ILRPi may be located at the end of the list and ILRPj may be located after short-term reference pictures after the current picture.

In this case, reference picture list L0 may consist of short-term reference picture(s) before the current picture, an inter-layer reference picture ILRPi, short-term reference picture(s) after the current picture, a long-term reference picture and an inter-layer reference picture ILRPj in this order. Reference picture list L1 may consist of short-term reference picture(s) after the current picture, an inter-layer reference picture ILRPj, short-term reference picture(s) before the current picture, a long-term reference picture and an inter-layer reference picture ILRPi in this order.

In addition, one of two inter-layer reference pictures may be an inter-layer reference picture derived from a scalable layer for resolution and the other may be an inter-layer reference picture derived from a layer for providing another view. In this case, for example, if ILRPi is an inter-layer reference picture derived from a layer for providing different resolution and ILRPj is an inter-layer reference picture derived from a layer for providing a different view, in the case of scalable video coding supporting only scalability excluding a view, reference picture list L0 may consist of short-term reference picture(s) before the current picture, an inter-layer reference picture ILRPi, short-term reference picture(s) after the current picture, and a long-term reference picture in this order, and reference picture list L1 may consist of short-term reference picture(s) after the current picture, short-term reference picture(s) before the current picture, a long-term reference picture and an inter-layer reference picture ILRPi in this order.

Meanwhile, in inter-layer prediction, as information on an inter-layer reference picture, only a sample value may be used, only motion information (motion vector) may be used or both a sample value and motion information may be used. The predictor 420-1 may use only a sample value of the inter-layer reference picture, may use only motion information (motion vector) of the inter-layer reference picture or may use both the sample value and motion information of the inter-layer reference picture according to information received from the encoding apparatus, when the reference picture index indicates an inter-layer reference picture.

When only the sample value of the inter-layer reference picture is used, the predictor 220-1 may derive samples of a block specified by a motion vector from the inter-layer reference picture as a prediction sample of a current block. In the case of scalable video coding which does not take a view into consideration, a motion vector in inter prediction (inter-layer prediction) using an inter-layer reference picture may be set to a fixed value (e.g., 0).

When only the motion information of the inter-layer reference picture is used, the predictor 220-1 may use a motion vector specified by the inter-layer reference picture as a motion vector predictor for deriving the motion vector of the current block. In addition, the predictor 220-1 may use a motion vector specified by the inter-layer reference picture as the motion vector of the current block.

When both the sample value and motion information of the inter-layer reference picture are used, the predictor 220-1 may use, for prediction of the current block, a sample of a region corresponding to the current block in the inter-layer reference picture and motion information (motion vector) specified in the inter-layer reference picture.

The encoding apparatus may transmit a reference index indicating an inter-layer reference picture in a reference picture list to the decoding apparatus, when inter-layer prediction is applied, and may transmit, to the decoding apparatus, information for specifying which information (sample information, motion information or sample information and motion information) is used from the inter-layer reference picture, that is, information for specifying a dependency type of dependency for inter-layer prediction between two layers.

Figure 5:
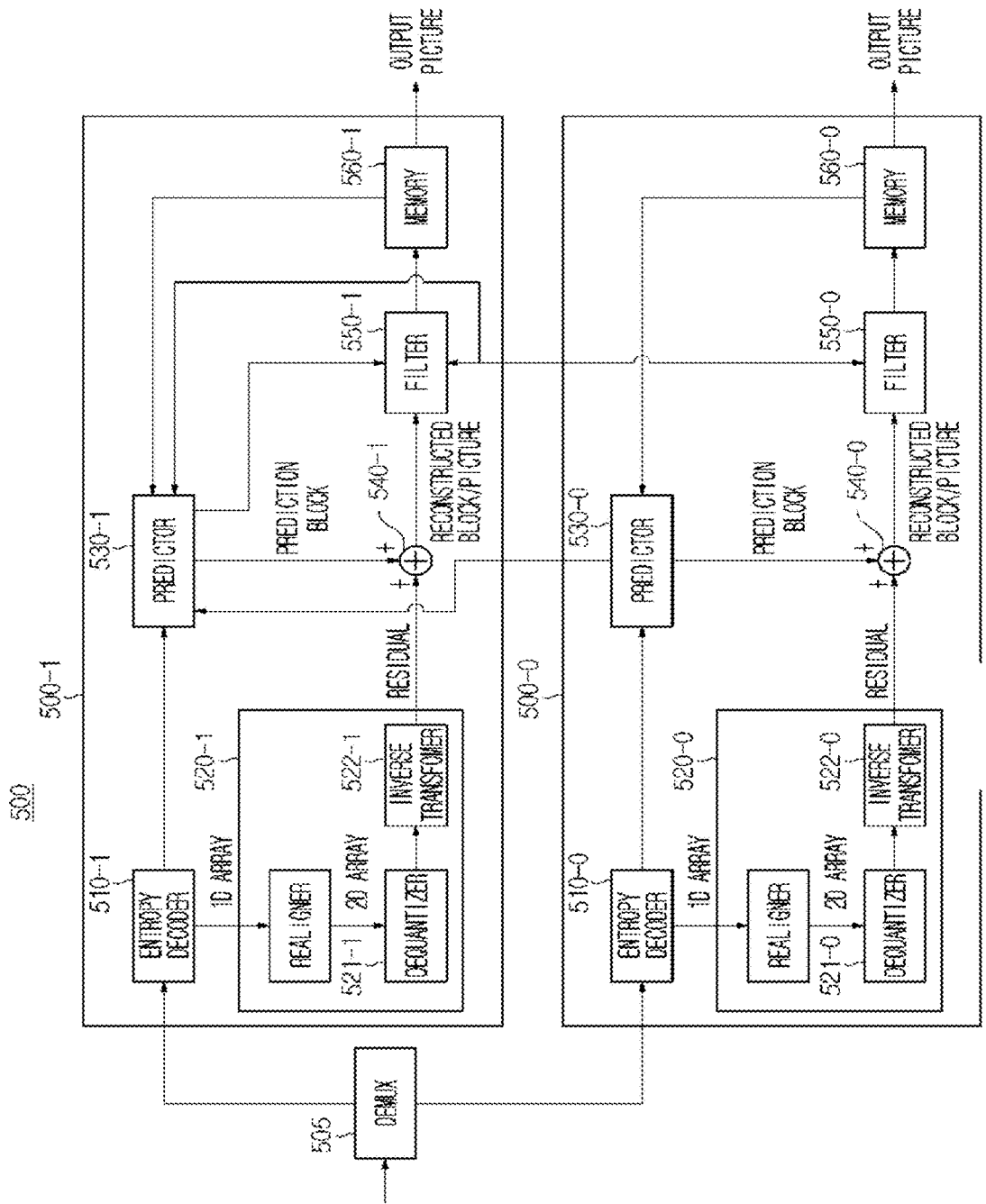
FIG. 5 is a schematic block diagram of a multi-layer decoding apparatus, to which embodiment(s) of the present disclosure is applicable, and, in which decoding of a multi-layer video/image signal is performed.

FIG. 5 is a schematic block diagram of a multi-layer decoding apparatus, to which embodiment(s) of the present disclosure is applicable, and, in which decoding of a multi-layer video/image signal is performed. The decoding apparatus of FIG. 5 may include the decoding apparatus of FIG. 3. A realigner shown in FIG. 5 may be omitted or included in a dequantizer. In the description of this drawing, multi-layer based prediction will be focused upon. In addition, the description of the decoding apparatus of FIG. 3 may be included.

In the example of FIG. 5, for convenience of description, a multi-layer structure consisting of two layers will be described. However, it should be noted that embodiments of the present disclosure are not limited thereto, and the multi-layer structure, to which the embodiment of the present disclosure is applied, may include two or more layers.

Referring to FIG. 5, the decoding apparatus 500 may include a decoder 500-1 of layer 1 and a decoder 500-0 of layer 1. The decoder 500-1 of layer 1 may include an entropy decoder 510-1, a residual processor 520-1, a predictor 530-1, an adder 540-1, a filter 550-1 and a memory 560-1. The decoder 500-2 of layer 0 may include an entropy decoder 510-0, a residual processor 520-0, a predictor 530-0, an adder 540-0, a filter 550-0 and a memory 560-0.

When a bitstream including image information is received from the encoding apparatus, a DEMUX 505 may demultiplex information for each layer and transmit the information to the decoding apparatus for each layer.

The entropy decoders 510-1 and 510-0 may perform decoding in correspondence with a coding method used in the encoding apparatus. For example, when CABAC is used in the encoding apparatus, the entropy decoders 510-1 and 510-0 may perform entropy decoding using CABAC.

When a prediction mode for a current block is an intra prediction mode, the predictors 530-1 and 530-0 may perform intra prediction for the current block based on neighboring reconstructed samples in the current picture.

When an prediction mode for a current block is an inter prediction mode, the predictors 530-1 and 530-0 may perform inter prediction for the current block based on information included in at least one of picture before or after the current picture. Some or all of motion information necessary for inter prediction may be derived by checking information received from the encoding apparatus.

When a skip mode is applied as an inter prediction mode, residual is not transmitted from the encoding apparatus and a prediction block may be a reconstructed block.

Meanwhile, the predictor 530-1 of layer 1 may perform inter prediction or intra prediction using only information on layer 1 and perform inter-layer prediction using information on another layer (layer 0).

As information on a current layer predicted using information on another layer (e.g., predicted by inter-layer prediction), there may be at least one of texture, motion information, unit information, a predetermined parameter (e.g., a filtering parameter, etc.).

As information on another layer used for prediction of the current layer (e.g., used for inter-layer prediction), there may be at least one of texture, motion information, unit information, a predetermined parameter (e.g., a filtering parameter, etc.).

In inter-layer prediction, a current block may be a block in a current picture in a current layer (e.g., layer 1) and may be a block to be decoded. A reference block may be a block in a picture (reference picture) belonging to the same access unit (AU) as a picture (current picture), to which the current block belongs, on a layer (reference layer, e.g., layer 0) referenced for prediction of the current block and may be a block correspond to the current block.

The multi-layer decoding apparatus 500 may perform inter-layer prediction as described in the multi-layer encoding apparatus 400. For example, the multi-layer decoding apparatus 500 may perform inter-layer texture prediction, inter-layer motion prediction, inter-layer unit information prediction, inter-layer parameter prediction, inter-layer residual prediction, inter-layer difference prediction, inter-layer syntax prediction, etc., as described in the multi-layer encoding apparatus 400 and inter-layer prediction applicable in the present disclosure is not limited thereto.

The predictor 530-1 may perform inter-layer prediction using an inter-layer reference picture, when a reference picture index received from the encoding apparatus or a reference picture index derived from a neighboring block indicates an inter-layer reference picture in a reference picture list. For example, the predictor 530-1 may derive a sample value of a region specified by a motion vector in the inter-layer reference picture as a prediction block for a current block, when a reference picture index indicates an inter-layer reference picture.

In this case, the inter-layer reference picture may be included in a reference picture list for a current block. The predictor 530-1 may perform inter prediction for the current block using the inter-layer reference picture.

As described above in the multi-layer encoding apparatus 400, in operation of the multi-layer decoding apparatus 500, the inter-layer reference picture may be a reference picture constructed by sampling a reconstructed picture of a reference layer to correspond to a current layer. Processing for the case where the reconstructed picture of the reference layer corresponds to the picture of the current layer may be performed in the same manner as the encoding process.

In addition, as described above in the multi-layer encoding apparatus 400, in operation of the multi-layer decoding apparatus 500, a reconstructed picture of a reference layer, from which an inter-layer reference picture is derived, may be a picture belonging to the same AU as a current picture to be encoded.

In addition, as described above in the multi-layer encoding apparatus 400, in operation of the multi-layer decoding apparatus 500, when inter prediction for a current block is performed by including the inter-layer reference picture in a reference picture list, the position of the inter-layer reference picture in the reference picture list may be different between reference picture lists L0 and L1.

In addition, as described above in the multi-layer encoding apparatus 400, in operation of the multi-layer decoding apparatus 500, when inter prediction for a current block is performed based on a reference picture list including an inter-layer reference picture, the reference picture list may include a plurality of inter-layer reference pictures derived from a plurality of layers, and arrangement of inter-layer reference pictures may be performed to correspond to that described in the encoding process.

In addition, as described above in the multi-layer encoding apparatus 400, in operation of the multi-layer decoding apparatus 500, as information on an inter-layer reference picture, only a sample value may be used, only motion information (motion vector) may be used or both a sample value and motion information may be used.

The multi-layer decoding apparatus 500 may receive a reference index indicating an inter-layer reference picture in a reference picture list from the multi-layer encoding apparatus 400 and perform inter-layer prediction based on the same. In addition, the multi-layer decoding apparatus 500 may receive, from the multi-layer encoding apparatus 400, information for specifying which information (sample information, motion information or sample information and motion information) is used from the inter-layer reference picture, that is, information for specifying a dependency type of dependency for inter-layer prediction between two layers.

An image encoding method and a decoding method respectively performed by a multi-layer image encoding apparatus and a multi-layer image decoding apparatus according to an embodiment will be described with reference to FIGS. 6 and 7. Hereinafter, for convenience of description, a multi-layer image encoding apparatus is referred to as an image encoding apparatus. In addition, a multi-layer image decoding apparatus is referred to as an image decoding apparatus.

Figure 6:
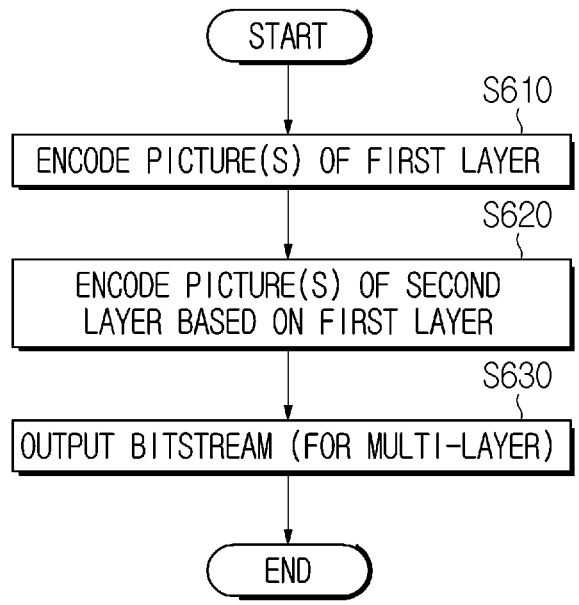
FIG. 6 is a view illustrating a method of encoding an image based on a multi-layer structure by an image encoding apparatus according to an embodiment.

FIG. 6 is a view illustrating a method of encoding an image based on a multi-layer structure by an image encoding apparatus according to an embodiment. The image encoding apparatus according to an embodiment may encode picture(s) of a first layer (S610). Next, the image encoding apparatus may encode picture(s) of a second layer based on the first layer (S620). Next, the encoding apparatus may output a bitstream (for the multi-layer) (S630).

Figure 7:
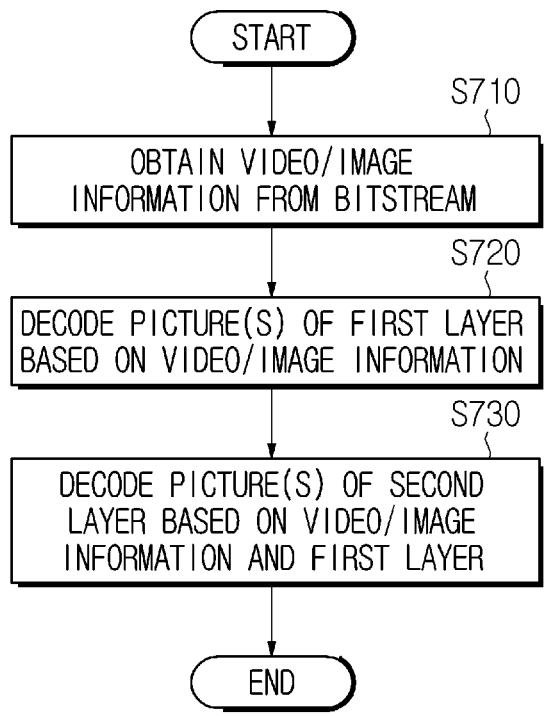
FIG. 7 is a view illustrating a method of decoding an image based on a multi-layer structure by an image decoding apparatus according to an embodiment.

FIG. 7 is a view illustrating a method of decoding an image based on a multi-layer structure by an image decoding apparatus according to an embodiment. The image decoding apparatus according to an embodiment may obtain video/image information from a bitstream (S710). Next, the image decoding apparatus may decode picture(s) of a first layer based on video/image information (S720). Next, the image decoding apparatus may decode picture(s) of a second layer based on the video/image information and the first layer (S730).

In an embodiment, the video/image information may include a high level syntax (HLS) described below. In an embodiment, the HLS may include an SPS and/or a PPS as disclosed in the present disclosure. For example, the video/image information may include information and/or syntax elements described in the present disclosure. As described in the present disclosure, the picture(s) of the second layer may be encoded based on motion information/reconstructed sample/parameters of the picture(s) of the first layer. In an embodiment, the first layer may be lower than the second layer. In an embodiment, when the second layer is a current layer, the first layer may be referenced as a reference layer.

Signaling of Reference Picture List

A reference picture list may be signaled in a reference picture list structure. The syntax for the reference picture list structure is as shown in FIG. 8.

FIG. 8 is a diagram illustrating ref_pic_lists( ) syntax.

ref_pic_lists( ) of FIG. 8 may be present in a picture header syntax structure or a slide header.

Referring to FIG. 8, ref_pic_lists( ) may include a plurality of syntax elements regarding the reference picture list.

Specifically, ref_pic_lists( ) may include a syntax element rpl_sps_flag[i]. rpl_sps_flag[i] of a first value (e.g., 1) may indicate that a reference picture list i in ref_pic_lists( ) is derived based on any one of ref_pic_list_struct(listIdx, rplsIdx) syntax structures having the same listIdx as i in an SPS. On the other hand, rpl_sps_flag[i] of a second value (e.g., 0) indicates that the reference picture list i is derived based on ref_pic_list_struct(listIdx, rplsIdx) having the same listIdx as i directly included in ref_pic_lists( ).

When rpl_sps_flag[i] is not present, the value of rpl_sps_flag[i] may be derived as follows.

When the value of sps_num_ref_pic_lists[i] is equal to a second value (e.g., 0), the value of rpl_sps_flag[i] may be inferred to be a second value (e.g., 0). Here, sps_num_ref_pic_lists[i] may indicate the number of ref_pic_list_struct(listIdx, rplsIdx) syntax structures having the same listIdx as i in the SPS. In an example, the value of sps_num_ref_pic_lists[i] may be in a range of 0 to 64.

Otherwise (e.g., when the value of sps_num_ref_pic_lists [i] is greater than a second value (e.g., 0)), if the value of pps_rpl1_idx_present_flag is equal to a second value (e.g., 0) and i is equal to a first value (e.g., 1), the value of rpl_sps_flag[1] may be inferred to be the same value as rpl_sps_flag[0]. Here, pps_rpl1_idx_present_flag may indicate whether rpl_sps_flag[1] and rpl_idx[1] are present in a picture header or slice header. For example, pps_rpl1_idx_present_flag of a first value (e.g., 1) may indicate that rpl_sps_flag[1] and rpl_idx [1] may be present in a picture header or slice header. On the other hand, pps_rpl1_idx_present_flag of a second value (e.g., 0) may indicate that rpl_sps_flag[1] and rpl_idx[1] are not present in a picture header or slice header.

In addition, ref_pic_lists( ) may include a syntax element rpl_idx[i]. rpl_idx[i] may indicate an index for a list of ref_pic_list_struct(listIdx, rplsIdx) syntax structures having the same listIdx as i in the SPS and used for derivation of the reference picture list i for the current picture. rpl_idx[i] may be represented by Ceil(Log 2(sps_num_ref_pic_lists[i])) bits. In an example, the value of rpl_idx[i] may be in a range of 0 to sps_num_ref_pic_lists[i]−1.

When rpl_idx[i] is not present, if the value of rpl_sps_flag [i] is equal to a first value (e.g., 1) and the value of pps_rpl1_idx_present_flag is equal to a second value (e.g., 0), the value of rpl_idx[i] may be inferred to be the same value as rpl_idx[0]. In other cases, the value of rpl_idx[i] may be inferred to be a second value (e.g., 0). Meanwhile, a variable RplsIdx[i] indicating an index of a reference picture list structure Rpls may be derived as shown in Equation 1 below based on a value of rpl_sps_flag[i].

RplsIdx[i]=rpl_sps_flag[i]?rpl_idx[i]: sps_num_ref_pic_lists[i]     [Equation 1]

Referring to Equation 1, when rpl_sps_flag[i] has a first value (e.g., 1), the value of RplsIdx[i] may be set to the same value as rpl_idx[i]. Alternatively, when rpl_sps_flag[i] has a second value (e.g., 0), the value of RplsIdx[i] may be set to the same value as sps_num_ref_pic_lists[i].

In addition, ref_pic_lists( ) may include a syntax element poc_lsb_lt[i][j]. poc_lsb_lt[i][j] may indicate MaxPicOrderCntLsb, which is a picture order count (POC) modulo value of a j-th long term reference picture (LTRM) entry in an i-th reference picture list in ref_pic_lists( ). The length of poc_lsb_lt[i][j] may be equal to sps_log2_max_pic_order_cnt_lsb_minus4+4 bits. Meanwhile, the variable PocLsbLt[i][j] may be derived as shown in Equation 2 below based on ltrp_in_header_flag[i][RplsIdx[i]].

PocLsbLt[i][j]=ltrp_in_header_flag[i]
[RplsIdx[i]]?poc_lsb_lt[i][j]: rpls_poc_lsb_lt
[listIdx][RplsIdx[i]][j]     [Equation 2]

Referring to Equation 2, when ltrp_in_header_flag[i][RplsIdx[i]] has a first value (e.g., 1), the value of PocLsbLt[i][j] may be set to the same value as poc_lsb_lt[i][j]. On the other hand, if ltrp_in_header_flag[i][RplsIdx[i]] has a second value (e.g., 0), the value of PocLsbLt[i][j] is set to the same value as rpls_poc_lsb_lt[listIdx][RplsIdx[i]][j] ]. Here, rpls_poc_lsb_lt[listIdx][RplsIdx[i]][j] may indicate MaxPicOrderCntLsb, which is a POC modulo value of a picture referenced by an i-th entry in ref_pic_list_struct(listIdx, rplsIdx). rpls_poc_lsb_lt[listIdx][RplsIdx[i]][j] may be included in a ref_pic_list_struct(listIdx, rplsIdx) syntax structure to be described later.

In addition, ref_pic_lists( ) may include a syntax element delta_poc_msb_cycle_present_flag[i][j]. delta_poc_msb_cycle_present_flag[i][j] of a first value (e.g., 1) may indicate that delta_poc_msb_cycle_lt[i][j] is present. On the other hand, delta_poc_msb_cycle_present_flag[i][j] of a second value (e.g., 0) may indicate that delta_poc_msb_cycle_lt[i][j] is not present.

On the other hand, prevTid0Pic is a previous picture of a current picture in decoding order, has the same nuh_layer_id as a slice header or picture header referring to a ref_pic_lists( ) syntax structure, has TemporalId equal to 0, and may not be a RASL or RADL picture. In this case, a POC set (\setOfPrevPocVals of the previous picture may be configured as follows.

PicOrderCntVal of prevTid0Pic
PicOrderCntVal of each picture referenced by an entry in an L0 reference picture list RefPicList[0] or an L1 reference picture list RefPicList[1] of prevTid0Pic and having the same nuh_layer_id as a current picture
PicOrderCntVal of each picture that follows prevTid0Pic in decoding order, has the same nuh_layer_id as a current picture and precedes the current picture in decoding order In this case, when there is more than one value in setOfPrevPocVals for which the value modulo MaxPicOrderCntLsb is equal to PocLsbLt[i][j], the value of delta_poc_msb_cycle_present_flag[i][j] may be limited to a first value (e.g., 1).

In addition, ref_pic_lists( ) may include a syntax element delta_poc_msb_cycle_lt[i][j]. delta_poc_msb_cycle_lt[i][j] may indicate the value of FullPocLt[i][j] according to the method shown in Table 1.

TABLE 1

```
if( j == 0 )
    deltaPocMsbCycleLt[ i ][ j ] = delta_poc_msb_cycle_lt[ i ][ j ]
else
    deltaPocMsbCycleLt[ i ][ j ] = delta_poc_msb_cycle_lt[ i ][ j ]
        + deltaPocMsbCycleLt[ i ][ j − 1 ]
FullPocLt[ i ][ j ] = PicOrderCntVal
    − deltaPocMsbCycleLt[ i ][ j ] * MaxPicOrderCntLsb
    − ( PicOrderCntVal & ( MaxPicOrderCntLsb − 1 ) )
    + PocLsbLt[ i ][ j ]
```

Referring to Table 1, if j is equal to 0, deltaPocMsbCycleLt[i][j] is set to the same value as delta_poc_msb_cycle_lt[i][j] and, if j is different from 0, deltaPocMsbCycleLt[i][j] may be set to a value obtained by adding deltaPocMsbCycleLt[i][j−1] to delta_poc_msb_cycle_lt[i][j]. In addition, based on the set deltaPocMsbCycleLt[i][j], FullPocLt[i][j] may be set to a predetermined value.

In an example, the value of delta_poc_msb_cycle_lt[i][j] may be in a rage of 0 to $2^{(32-sps\_log2\_max\_pic\_order\_cnt\_lsb\_minus4-4)}$. When delta_poc_msb_cycle_lt[i][j] is not present, the value delta_poc_msb_cycle_lt[i][j] may be inferred to be a second value (e.g., 0).

Meanwhile, syntax for configuring the reference picture list is as shown in FIG. 9.

FIG. 9 is a diagram illustrating ref_pic_list_struct(listIdx, rplsIdx) syntax.

ref_pic_list_struct(listIdx, rplsIdx) of FIG. 9 may be present in an SPS, picture header syntax structure or slice header. When ref_pic_list_struct(listIdx, rplsIdx) is present in a picture header syntax structure or slice header, ref_pic_list_struct(listIdx, rplsIdx) may indicate a reference picture list (e.g., listIdx) of a current picture (that is, an encoded picture including a picture header syntax structure or a slice header). On the other hand, when ref_pic_list_struct(listIdx, rplsIdx) is present in an SPS, ref_pic_list_struct(listIdx, rplsIdx) may indicate a candidate of a reference picture list (e.g., listIdx), and the term "current picture" in semantics may mean each picture 1) having one or more slices or a picture header syntax structure including rpl_idx[listIdx] of the same value as an index for a list of ref_pic_list_struct(listIdx, rplsIdx) included in an SPS and 2) present in a coded layer video sequence (CLVS) referring to the SPS.

Referring to FIG. 9, ref_pic_list_struct(listIdx, rplsIdx) may include syntax elements regarding a reference picture list.

Specifically, ref_pic_list_struct(listIdx, rplsIdx) may include a syntax element num_ref_entries[listIdx][rplsIdx]. num_ref_entries[listIdx][rplsIdx] may indicate the number of entries in a ref_pic_list_struct(listIdx, rplsIdx) syntax structure. In an example, the value of num_ref_entries[listIdx][rplsIdx] may be in a range of 0 to MaxDpbSize+13. Here, MaxDpbSize may indicate a maximum size of a decoded picture buffer (DPB).

In addition, ref_pic_list_struct(listIdx, rplsIdx) may include a syntax element ltrp_in_header_flag[listIdx][rplsIdx]. ltrp_in_header_flag[listIdx][rplsIdx] equal to a first value (e.g., 1) may indicate that picture order count (POC) least significant bits (LSBs) of LTRP entries indicated in ref_pic_list_struct(listIdx, rplsIdx) syntax are not present in ref_pic_list_struct(listIdx, rplsIdx). On the other hand, ltrp_in_header_flag[listIdx][rplsIdx] equal to a second value (e.g., 0) may indicate that picture order count (POC) least significant bits (LSBs) of LTRP entries indicated in ref_pic_list_struct(listIdx, rplsIdx) are present in ref_pic_list_struct(listIdx, rplsIdx).

ltrp_in_header_flag[listIdx][rplsIdx] may be signaled based on sps_long_term_ref_pics_flag and rplsIdx. For example, when sps_long_term_ref_pics_flag has a first value (e.g., 1) and rplsIdx is less than sps_num_ref_pic_lists[listIdx], ltrp_in_header_flag[listIdx][rplsIdx] may be signaled in ref_pic_list_struct(listIdx, rplsIdx). On the other hand, when sps_long_term_ref_pics_flag has a second value (e.g., 0) or rplsIdx is greater than or equal to sps_num_ref_pic_lists[listIdx], ltrp_in_header_flag[listIdx][rplsIdx] may not be signaled in ref_pic_list_struct(listIdx, rplsIdx). In an example, when sps_long_term_ref_pics_flag has a first value (e.g., 1) and rplsIdx is equal to sps_num_ref_pic_lists[listIdx], the value of ltrp_in_header_flag[listIdx][rplsIdx] may be inferred to be a first value (e.g., 1).

In addition, ref_pic_list_struct(listIdx, rplsIdx) may include a syntax element inter_layer_ref_pic_flag[listIdx][rplsIdx][i]. inter_layer_ref_pic_flag[listIdx][rplsIdx][i] of a first value (e.g., 1) may indicate that an i-th entry in ref_pic_list_struct(listIdx, rplsIdx) is an inter-layer reference picture (ILRP) entry. On the other hand, inter_layer_ref_pic_flag[listIdx][rplsIdx][i] of a second value (e.g., 0) may indicate that an i-th entry in ref_pic_list_struct(listIdx, rplsIdx) is not an ILRP entry. In an example, when inter_layer_ref_pic_flag[listIdx][rplsIdx][i] is not present, the value of inter_layer_ref_pic_flag[listIdx][rplsIdx][i] may be inferred to be a second value (e.g., 0).

In addition, ref_pic_list_struct(listIdx, rplsIdx) may include a syntax element ilrp_idx[listIdx][rplsIdx][i]. ilrp_idx[listIdx][rplsIdx][i] may indicate an index for a direct reference layer list of an ILRP of an i-th entry in ref_pic_list_struct(listIdx, rplsIdx). In an example, the value of ilrp_idx[listIdx][rplsIdx][i] may be in a range of 0 to NumDirectRefLayers[GeneralLayerIdx[nuh_layer_id]]−1. Here, NumDirectRefLayers[GeneralLayerIdx[nuh_layer_id]] may indicate the number of reference layers in the direct reference layer list.

ilrp_idx[listIdx][rplsIdx][i] may be signaled based on inter_layer_ref_pic_flag[listIdx][rplsIdx][i]. For example, when inter_layer_ref_pic_flag[listIdx][rplsIdx][i] has a second value (e.g., 0) (that is, an i-th entry in ref_pic_list_struct(listIdx, rplsIdx) is not an ILRP entry), ilrp_idx[listIdx][rplsIdx][i] may not be signaled in ref_pic_list_struct(listIdx, rplsIdx). On the other hand, when inter_layer_ref_pic_flag[listIdx][rplsIdx][i] has a first value (e.g., 1) (that is, an i-th entry in ref_pic_list_struct(listIdx, rplsIdx) is an ILRP entry), ilrp_idx[listIdx][rplsIdx][i] may be signaled in ref_pic_list_struct(listIdx, rplsIdx).

As described above, when inter-layer information is present (i.e., inter_layer_ref_pic_flag[listIdx][rplsIdx][i]==1), a layer index (i.e., ilrp_idx[listIdx][rplsIdx][i]) for a direct reference layer list of an ILRP may be signaled regardless of the number of reference layers in the direct reference layer list. For example, even when a coded layer video sequence (CLVS) has only one reference layer for inter layer prediction in the direct reference layer list, ilrp_idx[listIdx][rplsIdx][i] may be unnecessarily signaled.

In order to solve this problem, according to embodiments of the present disclosure, ilrp_idx[listIdx][rplsIdx][i] may be signaled when the number of reference layers in the direct reference layer list is greater than 1. Accordingly, signaling efficiency of ilrp_idx[listIdx][rplsIdx][i] may be further improved.

Hereinafter, embodiments of the present disclosure will be described in detail with reference to the accompanying drawings.

Embodiment 1

According to Embodiment 1 of the present disclosure, in signaling a layer index of an inter-layer reference picture (ILRP) in a reference picture list (RPL) structure, when the RPL structure belongs to a layer having only one direct reference layer, signaling of the layer index may be skipped. Accordingly, presence of a syntax element (i.e., ilrp_idx[listIdx][rplsIdx][i]) indicating the layer index may be a condition regarding the number of direct reference layers. For example, when the number of direct reference layers is 1, ilrp_idx[listIdx][rplsIdx][i] is not present (that is, is not signaled), the value of ilrp_idx[listIdx][rplsIdx][i] may be inferred to be the same value as the layer index of the direct reference layer of a current layer.

A specific example of Embodiment 1 is as shown in FIG. 10.

FIG. 10 is a diagram illustrating ref_pic_list_struct(listIdx, rplsIdx) syntax according to an embodiment of the present disclosure. ref_pic_list_struct(listIdx, rplsIdx) of FIG. 10 may be present in an SPS, picture header syntax structure or slice header.

Referring to FIG. 10, ref_pic_list_struct(listIdx, rplsIdx) may include syntax elements regarding a reference picture list.

Specifically, ref_pic_list_struct(listIdx, rplsIdx) may include syntax elements num_ref_entries[listIdx][rplsIdx], ltrp_in_header_flag[listIdx][rplsIdx] and inter_layer_ref_pic_flag[listIdx][rplsIdx][i]. The semantics of each of the syntax elements are as described above with reference to FIG. 9.

In addition, ref_pic_list_struct(listIdx, rplsIdx) may include syntax elementilrp_idx[listIdx][rplsIdx] [i].

ilrp_idx[listIdx][rplsIdx][i] may indicate an index for a direct reference layer list of an ILRP of an i-th entry in ref_pic_list_struct(listIdx, rplsIdx). In an example, the value of ilrp_idx[listIdx][rplsIdx][i] may be in a range of 0 to NumDirectRefLayers[GeneralLayerIdx[nuh_layer_id]]−1.

ilrp_idx[listIdx][rplsIdx][i] may be signaled based on inter_layer_ref_pic_flag[listIdx][rplsIdx][i]. For example, when inter_layer_ref_pic_flag[listIdx][rplsIdx][i] has a second value (e.g., 0) (that is, when an i-th entry in ref_pic_list_struct(listIdx, rplsIdx) is not an ILRP entry), ilrp_idx[listIdx][rplsIdx][i] may not be signaled in ref_pic_list_struct(listIdx, rplsIdx).

On the other hand, when inter_layer_ref_pic_flag[listIdx][rplsIdx][i] has a first value (e.g., 1) (that is, when an i-th entry in ref_pic_list_struct(listIdx, rplsIdx) is an ILRP entry), ilrp_idx[listIdx][rplsIdx][i] may be signaled based on a first condition regarding the number of direct reference layers (that is, reference layers in a direct reference layer list). In an embodiment, the first condition may be defined using NumDirectRefLayers[GeneralLayerIdx[nuh_layer_id]] as follows.

NumDirectRefLayers[GeneralLayerIdx[nuh_layer_id]]>1          (First condition)

When the first condition is satisfied, for example, when the number of direct reference layers is equal to or greater than 2 (i.e., NumDirectRefLayers[GeneralLayerIdx[nuh_layer_id]]>=2), ilrp_idx[listIdx][rplsIdx][i] may be signaled in ref_pic_list_struct(listIdx, rplsIdx). On the other hand, when the first condition is not satisfied, for example, when the number of direct reference layers is 1 (i.e., NumDirectRefLayers[GeneralLayerIdx[nuh_layer_id]]==1), ilrp_idx[listIdx][rplsIdx][i] may not be signaled in ref_pic_list_struct(listIdx, rplsIdx). In an embodiment, when ilrp_idx[listIdx][rplsIdx][i] is not signaled, the value of ilrp_idx[listIdx][rplsIdx][i] may be inferred to be the same value as DirectRefLayerIdx[GeneralLayerIdx[nuh_layer_id]][0].

Meanwhile, a variable NumDirectRefLayers[i] may be derived as shown in Table 2 below. In addition, an input variable GeneralLayerIdx[nuh_layer_id]] of NumDirectRefLayers[i] indicates a layer index of a layer having the same nuh_layer_id as vps_layer_id[i] and may be derived as shown in Table 3 below.

TABLE 2

The variables NumDirectRefLayers[ i ], DirectRefLayerIdx[ i ][ d ], NumRefLayers[ i ], RefLayerIdx[ i ][ r ], and LayerUsedAsRefLayerFlag[ j ] are derived as follows:
for( i = 0; i <= vps_max_layers_minus1; i++ ) {
  for( j = 0; j <= vps_max_layers_minus1; j++ ) {
    dependencyFlag[ i ][ j ] = vps_direct_ref_layer_flag[ i ][ j ]
    for( k = 0; k < i; k++ )
      if( vps_direct_ref_layer_flag[ i ][ k ] && dependencyFlag[ k ][ j ] )
        dependencyFlag[ i ][ j ] = 1
  }
  LayerUsedAsRefLayerFlag[ i ] = 0
}
for( i = 0; i <= vps_max_layers_minus1; i++ ) {
  for( j = 0, d = 0, r = 0; j <= vps_max_layers_minus1; j++ ) {
    if( vps_direct_ref_layer_flag[ i ][ j ] ) {
      DirectRefLayerIdx[ i ][ d++ ] = j
      LayerUsedAsRefLayerFlag[ j ] = 1
    }
    if( dependencyFlag[ i ][ j ] )
      RefLayerIdx[ i ][ r++ ] = j
  }
  NumDirectRefLayers[ i ] = d
  NumRefLayers[ i ] = r
}

TABLE 3

The variable GeneralLayerIdx[ i ], specifying the layer index of the layer with nuh_layer_id equal to vps_layer_id[ i ], is derived as follows:
for( i = 0; i <= vps_max_layers_minus1; i++ )
  GeneralLayerIdx[ vps_layer_id[ i ] ] = i Referring to Table 2 and Table 3, NumDirectRefLayers[GeneralLayerIdx[nuh_layer_id]] may be derived based on syntax elements (e.g., vps_direct_ref_layer_flag[i][j], vps_max_layers_minus1) in a video parameter set (VPS).

According to Embodiment 1 of the present disclosure, when inter-layer information is present (i.e., inter_layer_ref_pic_flag[listIdx][rplsIdx][i]==1), a layer index (i.e., ilrp_idx[listIdx][rplsIdx][i]) for a direct reference layer list of an ILRP may be signaled only when the number of direct reference layers (that is, reference layers in the direct reference layer list) is greater than 1. Therefore, signaling efficiency of ilrp_idx[listIdx][rplsIdx][i] may be further improved.

Embodiment 2

In Embodiment 1 described above with reference to FIG. 10, a layer index (i.e., ilrp_idx[listIdx][rplsIdx][i]) for a direct reference layer list of an ILRP may be signaled based on a first condition (i.e., NumDirectRefLayers[GeneralLayerIdx[nuh_layer_id]]>1) regarding the number of direct reference layers (that is, reference layers in the direct reference layer list). However, since the first condition is defined based on NumDirectRefLayers[GeneralLayerIdx[nuh_layer_id]] dependent on the syntax elements in a VPS, when ref_pic_list_struct(listIdx, rplsIdx) is present in an SPS, parsing dependency of the SPS for the VPS may occur in a parsing process of ilrp_idx[listIdx][rplsIdx][i].

In order to remove the parsing dependency, according to Embodiment 2 of the present disclosure, the first condition is modified to be applied only when ref_pic_list_struct (listIdx, rplsIdx) is present in a picture header syntax structure or slice header. For example, if ref_pic_list_struct (listIdx, rplsIdx) is present in the SPS, ilrp_idx[listIdx][rplsIdx][i] may be signaled regardless of the number of direct reference layers. To this end, it may be additionally determined whether the index of the RPL structure is greater than or equal to the number of RPL structures signaled in the SPS. On the other hand, if ref_pic_list_struct(listIdx, rplsIdx) is present in the picture header syntax structure or slice header, ilrp_idx[listIdx][rplsIdx][i] may be signaled only when the number of direct reference layers is greater than 1, as described above with reference to FIG. 10.

A specific example of Embodiment 2 is as shown in FIG. 11.

FIG. 11 is a diagram illustrating ref_pic_list_struct(listIdx, rplsIdx) syntax according to an embodiment of the present disclosure. ref_pic_list_struct(listIdx, rplsIdx) of FIG. 11 may be present in an SPS, picture header syntax structure, or slice header.

Referring to FIG. 11, ref_pic_list_struct(listIdx, rplsIdx) may include syntax elements regarding a reference picture list.

Specifically, ref_pic_list_struct(listIdx, rplsIdx) may include syntax elements num_ref_entries[listIdx][rplsIdx], ltrp_in_header_flag[listIdx][rplsIdx] and inter_layer_ref_pic_flag[listIdx][rplsIdx][i]. The semantics of each of the syntax elements are as described above with reference to FIG. 9.

In addition, ref_pic_list_struct(listIdx, rplsIdx) may include a syntax element ilrp_idx[listIdx][rplsIdx][i].

ilrp_idx[listIdx][rplsIdx][i] may indicate an index for a direct reference layer list of an ILRP of an i-th entry in ref_pic_list_struct(listIdx, rplsIdx). In an example, the value of ilrp_idx[listIdx][rplsIdx][i] may be in a range of 0 to NumDirectRefLayers[GeneralLayerIdx[nuh_layer_id]]−1.

ilrp_idx[listIdx][rplsIdx][i] may be signaled based on whether ref_pic_list_struct(listIdx, rplsIdx) is present in the SPS and a second condition regarding the number of direct reference layers. In an embodiment, the second condition may be defined as follows.

rplsIdx<sps_num_ref_pic_lists[listIdx]||NumDirectRefLayers[GeneralLayerIdx[nuh_layer_id]]>1    (Second condition)

Here, sps_num_ref_pic_lists[listIdx] may indicate the number of ref_pic_list_struct(listIdx, rplsIdx) syntax structures included in the SPS. In an example, the value of sps_num_ref_pic_lists[listIdx] may be in a range of 0 to 64.

The second condition may be composed of an OR of a (2-1)-th condition (i.e., rplsIdx<sps_num_ref_pic_lists[listIdx]) regarding whether ref_pic_list_struct(listIdx, rplsIdx) is present in the SPS and a (2-2)-th condition (i.e., NumDirectRefLayers[GeneralLayerIdx[nuh_layer_id]]>1) regarding the number of direct reference layers. That is, if any one of the (2-1)-th condition and the (2-2)-th condition is true, the second condition may be satisfied, and, when both the (2-1)-th condition and the (2-2)-th condition are false, the second condition may not be satisfied.

Whether the (2-1)-th condition is satisfied may be determined whether ref_pic_list_struct(listIdx, rplsIdx) is present in the SPS (or is called in the SPS). For example, when ref_pic_list_struct(listIdx, rplsIdx) is present in the SPS, the value of rplsIdx which is a call input value of ref_pic_list_struct(listIdx, rplsIdx) may be less than the value of sps_num_ref_pic_lists[listIdx]. In this case, the (2-1)-th condition may be true. On the other hand, when ref_pic_list_struct(listIdx, rplsIdx) is not present in the SPS, for example, when ref_pic_list_struct(listIdx, rplsIdx) is present in ref_pic_lists( ) described with reference to FIG. 8 (i.e., rpl_sps_flag[i]==0), the value of rplsIdx which is a call input value of ref_pic_list_struct(listIdx, rplsIdx) may be equal to the value of sps_num_ref_pic_lists[listIdx]. In this case, the (2-1)-th condition may be false.

When the (2-1)-th condition is satisfied (that is, when ref_pic_list_struct(listIdx, rplsIdx) is present in the SPS), ilrp_idx[listIdx][rplsIdx][i] may be signaled in ref_pic_list_struct(listIdx, rplsIdx) regardless of the number of direct reference layers. Therefore, in the parsing process of ilrp_idx[listIdx][rplsIdx][i], since it is not necessary to consider the (2-2)-th condition based on NumDirectRefLayers[GeneralLayerIdx[nuh_layer_id]], the parsing dependency of the SPS for the VPS may be removed.

Meanwhile, when the (2-1)-th condition is not satisfied (that is, when ref_pic_list_struct(listIdx, rplsIdx) is not present in the SPS), ilrp_idx[listIdx][rplsIdx][i] may be signaled based on the (2-2)-th condition. For example, even when the (2-1)-th condition is not satisfied, when the number of direct reference layers is equal to or greater than 2 (i.e., NumDirectRefLayers[GeneralLayerIdx[nuh_layer_id]]>=2), ilrp_idx[listIdx][rplsIdx][i] may be signaled in ref_pic_list_struct(listIdx, rplsIdx). On the other hand, when the (2-1)-th condition is not satisfied and the number of direct reference layers is 1 (i.e., NumDirectRefLayers[GeneralLayerIdx[nuh_layer_id]] 1), ilrp_idx[listIdx][rplsIdx][i] may not be signaled in ref_pic_list_struct(listIdx, rplsIdx). Therefore, when a CLVS (coded layer video sequence) has only one reference layer for inter-layer prediction in the direct reference layer list, it is possible to prevent ilrp_idx[listIdx][rplsIdx][i] from being unnecessarily signaled. In an embodiment, when ilrp_idx[listIdx][rplsIdx][i] is not signaled, the value of ilrp_idx[listIdx][rplsIdx][i] may be inferred to be the same value as DirectRefLayerIdx[GeneralLayerIdx[nuh_layer_id]][0].

According to Embodiment 2 of the present disclosure, when inter-layer information is present (i.e., inter_layer_ref_pic_flag[listIdx][rplsIdx][i]==1), a layer index (i.e., ilrp_idx[listIdx][rplsIdx][i]) for the direct reference layer list of the ILRP may be signaled only when ref_pic_list_struct(listIdx, rplsIdx) is present in the SPS or the number of direct reference layers is greater than 1. Accordingly, it is possible to remove the parsing dependency for the VPS of the SPS that may occur in the parsing process of ilrp_idx[listIdx][rplsIdx][i] and to further improve signaling efficiency of ilrp_idx[listIdx][rplsIdx][i].

Embodiment 3

According to Embodiment 3 of the present disclosure, in signaling of a layer index of an ILRP in a RPL structure, when the RPL structure belongs to a layer having only one direct reference layer, signaling of the layer index may be skipped. Therefore, presence of a syntax element (i.e., ilrp_idx[listIdx][rplsIdx][i]) indicating the layer index may be a condition regarding the number of direct reference layers.

Meanwhile, in order to remove the parsing dependency of the SPS for the VPS that may occur in the parsing process of ilrp_idx[listIdx][rplsIdx][i], a new syntax element (e.g., sps_num_direct_reference_layers_minus1) indicating the number of direct reference layers may be defined in the SPS. The new syntax element may be present (that is, signaled)

only when inter-layer prediction is allowed (i.e., sps_inter_layer_ref_pics_present_flag==1). When the value of sps_num_direct_reference_layers_minus1 is 0, ilrp_idx[listIdx][rplsIdx][i] is not present, and the value of ilrp_idx[listIdx][rplsIdx][i] may be inferred to be the same value as the layer index of the direct reference layer of the current layer. In addition, ilrp_idx[listIdx][rplsIdx][i] may be signaled based on the new syntax element.

A specific example of Embodiment 3 is as shown in FIGS. 12 and 13.

FIG. 12 is a diagram illustrating SPS syntax according to an embodiment of the present disclosure.

Referring to FIG. 12, the SPS may include a syntax element sps_num_direct_reference_layers_minus1 regarding the number of direct reference layers.

sps_num_direct_reference_layers_minus1 plus 1 may indicate the number of direct reference layers referenced by pictures in a coded layer video sequence (CLVS).

sps_num_direct_reference_layers_minus1 may be signaled based on whether an ILRP for inter prediction of one or more coded pictures in the CLVS is present (i.e., sps_inter_layer_ref_pics_present_flag). For example, when the ILRP is present (i.e., sps_inter_layer_ref_pics_present_flag==1) (or when inter-layer prediction is allowed for the CLVS), sps_num_direct_reference_layers_minus1 may be signaled in the SPS. On the other hand, when the ILRP is not present (i.e., sps_inter_layer_ref_pics_present_flag==0) (or when inter-layer prediction is not allowed for the CLVS), sps_num_direct_reference_layer_minus1 may not be signaled in the SPS.

FIG. 13 is a diagram illustrating ref_pic_list_struct(listIdx, rplsIdx) syntax according to an embodiment of the present disclosure. ref_pic_list_struct(listIdx, rplsIdx) of FIG. 13 may be present in an SPS, picture header syntax structure or slice header.

Referring to FIG. 13, ref_pic_list_struct(listIdx, rplsIdx) may include syntax elements regarding a reference picture list.

Specifically, ref_pic_list_struct(listIdx, rplsIdx) may include syntax elements num_ref_entries[listIdx][rplsIdx], ltrp_in_header_flag[listIdx][rplsIdx] and inter_layer_ref_pic_flag[listIdx][rplsIdx][i]. The semantics of each of the syntax elements are as described above with reference to FIG. 9.

In addition, ref_pic_list_struct(listIdx, rplsIdx) may include a syntax element ilrp_idx[listIdx][rplsIdx][i].

ilrp_idx[listIdx][rplsIdx][i] may indicate an index for a direct reference layer list of an ILRP of an i-th entry in ref_pic_list_struct(listIdx, rplsIdx). In an example, the value of ilrp_idx[listIdx][rplsIdx][i] may be in a range of 0 to NumDirectRefLayers[GeneralLayerIdx[nuh_layer_id]]−1.

ilrp_idx[listIdx][rplsIdx][i] may be signaled based on a third condition regarding the number of direct reference layers (that is, reference layers in a direct reference layer list). In an embodiment, the third condition may be defined as follows.

sps_num_direct_reference_layers_minus1>0 (Third condition)

Here, sps_num_direct_reference_layers_minus1 plus 1 may indicate the number of direct reference layers.

When the third condition is satisfied, for example, when the number of direct reference layers is equal to or greater than 2 (i.e., sps_num_direct_reference_layers_minus1>=1), ilrp_idx[listIdx][rplsIdx][i] may be signaled in ref_pic_list_struct(listIdx, rplsIdx). On the other hand, when the third condition is not satisfied, for example, when the number of direct reference layers is 1 (i.e., sps_num_direct_reference_layers_minus1==0), ilrp_idx[listIdx][rplsIdx][i] may not be signaled in ref_pic_list_struct(listIdx, rplsIdx). In an embodiment, when ilrp_idx[listIdx][rplsIdx][i] is not signaled, the value of ilrp_idx[listIdx][rplsIdx][i] may be inferred to be the same value as DirectRefLayerIdx[GeneralLayerIdx[nuh_layer_id]][0].

Embodiment 3 may be equal to Embodiment 1 described above with reference to FIG. 10 in that, only when the number of direct reference layers is greater than 1, ilrp_idx[listIdx][rplsIdx][i] is signaled in ref_pic_list_struct(listIdx, rplsIdx). However, in Embodiment 1, since ilrp_idx[listIdx][rplsIdx][i] is signaled based on the value (that is, the first condition) of NumDirectRefLayers[GeneralLayerIdx[nuh_layer_id]], the parsing dependency of the SPS for the VPS may occur. On the other hand, in Embodiment 3, since ilrp_idx[listIdx][rplsIdx][i] is signaled based on the value (that is, the third condition) of sps_num_direct_reference_layers_minus1 in the SPS, the parsing dependency of the SPS for the VPS may not occur.

According to Embodiment 3 of the present disclosure, ilrp_idx[listIdx][rplsIdx][i] may be signaled only when the number of direct reference layers is greater than 1. In this case, the number of direct reference layers may be determined based on sps_num_direct_reference_layers_minus1, regardless of layer-dependent information signaled in the VPS. Accordingly, it is possible to remove the parsing dependency for the VPS of the SPS that may occur in the parsing process of ilrp_idx[listIdx][rplsIdx][i] and to further improve signaling efficiency of ilrp_idx[listIdx][rplsIdx][i].

Embodiment 4

According to Embodiment 4 of the present disclosure, in signaling of a layer index of an ILRP in a RPL structure, when the RPL structure belongs to a layer having only one direct reference layer, signaling of the layer index may be skipped. Therefore, presence of a syntax element (i.e., ilrp_idx[listIdx][rplsIdx][i]) indicating the layer index may be a condition regarding the number of direct reference layers.

To this end, a new syntax element (e.g., sps_ref_layer_idx_plus1) indicating whether the current layer has only one direct reference layer or has two or more direct reference layers may be defined in the SPS. When the current layer has only one direct reference layer, the new syntax element may indicate a layer index of the direct reference layer. In addition, ilrp_idx[listIdx][rplsIdx][i] may be signaled based on the new syntax element.

A specific example of Embodiment 4 is as shown in FIGS. 14 and 15.

FIG. 14 is a diagram illustrating SPS syntax according to an embodiment of the present disclosure.

Referring to FIG. 14, the SPS may include a syntax element sps_ref_layer_idx_plus1 indicating a layer index of a direct reference layer.

sps_ref_layer_idx_plus1 minus 1 may indicate a layer index of a direct reference layer referenced by pictures in a coded layer video sequence (CLVS). sps_ref_layer_idx_plus1 having a value equal to 0 may indicate that more than one direct reference layer referenced by the pictures in the CLVS is present. In other words, when the value of sps_ref_layer_idx_plus1 is equal to 0, the number of direct reference layers may be greater than 1, and sps_ref_layer_idx_plus1 may indicate the number of direct reference layers. On the other hand, when the value of sps_ref_layer_idx_plus1 is different from 0, the number of direct reference layers may be 1, and sps_ref_layer_idx_plus1 may indicate the layer index of the direct reference layer.

sps_ref_layer_idx_plus1 may be signaled based on whether an ILRP for inter prediction of one or more coded pictures in the CLVS is present (i.e., sps_inter_layer_ref_pics_present_flag). For example, when the ILRP is present (i.e., sps_inter_layer_ref_pics_present_flag==1) (or when inter-layer prediction is allowed for the CLVS), sps_ref_layer_idx_plus1 may be signaled in the SPS. On the other hand, when the ILRP is not present (i.e., sps_inter_layer_ref_pics_present_flag==0) (or when inter-layer prediction is not allowed for the CLVS), sps_ref_layer_idx_plus1 may not be signaled in the SPS.

In an embodiment, the following constraints may be applied for bitstream conformance.

When the value of NumDirectRefLayers[GeneralLayerIdx[nuh_layer_id]] is greater than 1, the value of sps_ref_layer_idx_plus1 may be limited to 0. Here, NumDirectRefLayers[GeneralLayerIdx[nuh_layer_id]] may indicate the number of direct reference layers of a layer having an index of the same value as GeneralLayerIdx[nuh_layer_id].

In the other case (that is, when the value of NumDirectRefLayers[GeneralLayerIdx[nuh_layer_id]] is 1), the value of sps_ref_layer_idx_plus1 may be limited to the same value as DirectRefLayerIdx[GeneralLayerIdx[nuh_layer_id]][0]+1. Here, DirectRefLayerIdx[GeneralLayerIdx[nuh_layer_id]][0] may indicate the layer index of the direct reference layer of the current layer.

FIG. 15 is a diagram illustrating ref_pic_list_struct(listIdx, rplsIdx) syntax according to an embodiment of the present disclosure. ref_pic_list_struct(listIdx, rplsIdx) of FIG. 15 may be present in an SPS, picture header syntax structure or slice header.

Referring to FIG. 15, ref_pic_list_struct(listIdx, rplsIdx) may include syntax elements regarding a reference picture list.

Specifically, ref_pic_list_struct(listIdx, rplsIdx) may include syntax elements num_ref_entries[listIdx][rplsIdx], ltrp_in_header_flag[listIdx][rplsIdx] and inter_layer_ref_pic_flag[listIdx][rplsIdx][i]. The semantics of each of the syntax elements are as described above with reference to FIG. 9.

In addition, ref_pic_list_struct(listIdx, rplsIdx) may include a syntax element ilrp_idx[listIdx][rplsIdx][i].

ilrp_idx[listIdx][rplsIdx][i] may indicate an index for a direct reference layer list of an ILRP of an i-th entry in ref_pic_list_struct(listIdx, rplsIdx). In an example, the value of ilrp_idx[listIdx][rplsIdx][i] may be in a range of 0 to NumDirectRefLayers[GeneralLayerIdx[nuh_layer_id]]−1.

ilrp_idx[listIdx][rplsIdx][i] may be signaled based on a fourth condition regarding the number of direct reference layers (that is, reference layers in a direct reference layer list). In an embodiment, the fourth condition may be defined as follows.

sps_ref_layer_idx_plus1==0   (Fourth condition)

Here, sps_ref_layer_idx_plus1 minus 1 may indicate a layer index of a direct reference layer.

When the fourth condition is satisfied, that is, when the number of direct reference layers is equal to or greater than 2, ilrp_idx[listIdx][rplsIdx][i] may be signaled in ref_pic_list_struct(listIdx, rplsIdx). On the other hand, when the fourth condition is not satisfied, that is, when the number of direct reference layers is 1, ilrp_idx[listIdx][rplsIdx][i] may not be signaled in ref_pic_list_struct(listIdx, rplsIdx). In an embodiment, when ilrp_idx[listIdx][rplsIdx][i] is not signaled, the value of ilrp_idx[listIdx][rplsIdx][i] may be inferred to be the same value as sps_ref_layer_idx_plus1−1.

Embodiment 4 may be equal to Embodiment 1 described above with reference to FIG. 10 in that, only when the number of direct reference layers is greater than 1, ilrp_idx[listIdx][rplsIdx][i] is signaled in ref_pic_list_struct(listIdx, rplsIdx). However, in Embodiment 1, since ilrp_idx[listIdx][rplsIdx][i] is signaled based on the value (that is, the first condition) of NumDirectRefLayers[GeneralLayerIdx[nuh_layer_id]], the parsing dependency of the SPS for the VPS may occur. On the other hand, in Embodiment 4, since ilrp_idx[listIdx][rplsIdx][i] is signaled based on the value (that is, the fourth condition) of sps_ref_layer_idx_plus1 in the SPS, the parsing dependency of the SPS for the VPS may not occur.

Meanwhile, as a modified example of Embodiment 4, sps_ref_layer_idx_plus1 of FIG. 14 may be replaced with sps_ref_layer_id_plus1. When the value of sps_ref_layer_id_plus1 is greater than 0, sps_ref_layer_id_plus1 may indicate a layer Id (e.g., nuh_layer_id) instead of the layer index of the direct reference layer. Except for this, the semantics of sps_ref_layer_id_plus1 may be equal to those of sps_ref_layer_idx_plus1. In addition, the fourth condition may be changed to a fifth condition described below.

sps_ref_layer_id_plus1==0   (Fifth condition)

According to Embodiment 4 of the present disclosure, ilrp_idx[listIdx][rplsIdx][i] may be signaled only when the number of direct reference layers is greater than 1. In this case, the number of direct reference layers may be determined based on sps_ref_layer_idx_plus1, regardless of layer dependent information signaled in the VPS. Accordingly, it is possible to remove the parsing dependency for the VPS of the SPS that may occur in the parsing process of ilrp_idx[listIdx][rplsIdx][i] and to further improve signaling efficiency of ilrp_idx[listIdx][rplsIdx][i].

Hereinafter, an image encoding/decoding method according to an embodiment of the present disclosure will be described in detail with reference to FIGS. 16 and 17.

Figure 16:
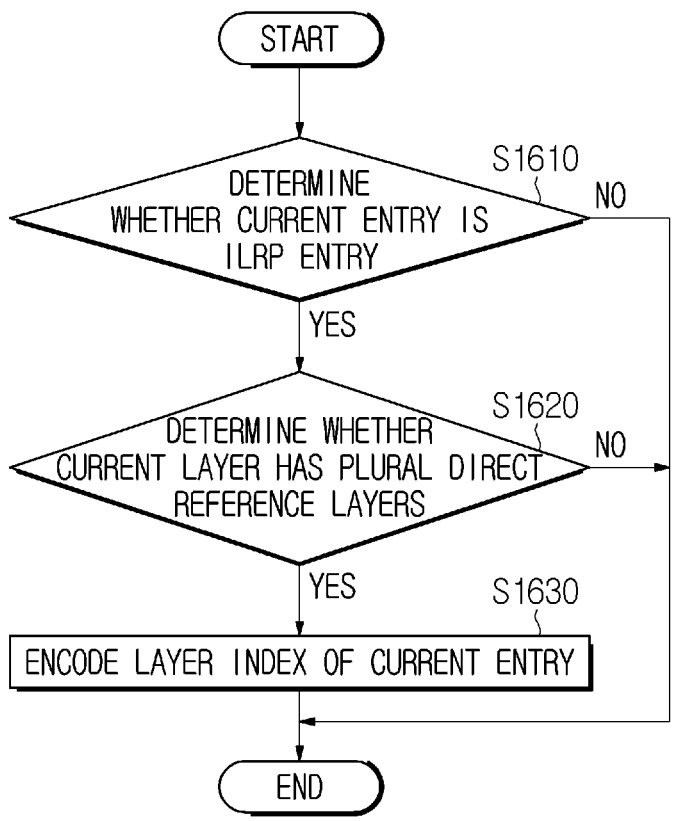
FIG. 16 is a flowchart illustrating an image encoding method according to an embodiment of the present disclosure.

FIG. 16 is a flowchart illustrating an image encoding method according to an embodiment of the present disclosure.

The image encoding method of FIG. 16 may be performed by the image encoding apparatus of FIG. 2 or 4. For example, steps S1610 to S1630 may be performed by the intra predictor 185 or the predictor 420-1.

Referring to FIG. 16, the image encoding apparatus may determine whether a current entry in a reference picture list structure (e.g., ref_pic_list_struct(listIdx, rplsIdx) is an inter-layer reference picture (ILRP) entry (S1610).

In an embodiment, based on the result of determination of step S1610, a syntax element inter_layer_ref_pic_flag[listIdx][rplsIdx][i] indicating whether the current entry is the ILRP entry may be coded in ref_pic_list_struct(listIdx, rplsIdx). For example, when the current entry is the ILRP entry, inter_layer_ref_pic_flag[listIdx][rplsIdx][i] may be coded into a first value (e.g., 1). On the other hand, when the current entry is not the ILRP entry, inter_layer_ref_pic_flag[listIdx][rplsIdx][i] may be coded into a second value (e.g., 0).

When the current entry is the ILRP entry (YES' in S1610), the image encoding apparatus may determine whether a current layer including a current picture has a plurality of direct reference layers (S1620).

In an embodiment, based on the result of determination of step S1620 and inter-layer prediction being allowed for a current video sequence, second information (e.g., sps_ num_direct_reference_layers_minus1, sps_ref_layer_idx_plus1 or sps_ref_layer_id_plus1) indicating whether the current layer has a plurality of direct reference layers may be coded in a sequence parameter set (SPS). For example, as the second information, sps_num_direct_reference_layers_minus1 may indicate the number of direct reference layers referenced by pictures in the current video sequence. In addition, as the second information, sps_ref_layer_idx_plus1 minus 1 may indicate a layer index of a direct reference layer referenced by pictures in a coded layer video sequence (CLVS). sps_ref_layer_idx_plus1 having a value equal to 0 may indicate that more than one direct reference layer referenced by pictures in the CLVS is present. In addition, as the second information, sps_ref_layer_id_plus1 may indicate a layer Id (e.g., nuh_layer_id) instead of the layer index of the direct reference layer. Except for this, the semantics of sps_ref_layer_id_plus1 may be equal to those of sps_ref_layer_idx_plus1.

When the current layer has a plurality of direct reference layers ('YES' in S1620), the image encoding apparatus may code (and signal) a layer index (e.g., ilrp_idx[listIdx][rplsIdx][i]) of the current entry for the direct reference layer list (S1630). On the other hand, when the current layer does not have a plurality of direct reference layers, encoding (and signaling) of the layer index (S1630) may be skipped.

In an embodiment, based on the reference picture list structure (e.g., ref_pic_list_struct(listIdx, rplsIdx)) being present in a sequence parameter set (SPS), the layer index may be coded (and signaled) regardless of whether the current layer has a plurality of direct reference layers. When the reference picture list structure is present in the SPS, the value of rplsIdx which is a call input value of the reference picture list structure may be less than the value of sps_num_ref_pic_lists[listIdx]. On the other hand, when the reference picture list structure is not present in the SPS, the value of rplsIdx which is a call input value of ref_pic_list_struct(listIdx, rplsIdx) may be equal to that of sps_num_ref_pic_lists[listIdx].

In an embodiment, based on the second information having a first value indicating a layer index of a direct reference layer referenced by pictures in the current video sequence, coding (and signaling) of the layer index may be skipped. Here, the first value may mean a non-zero positive integer. For example, when the value of sps_ref_layer_idx_plus1 is 2, a layer index value of a direct reference layer referenced by pictures in a coded layer video sequence (CLVS) is 1 and coding (and signaling) of the layer index may be skipped. On the other hand, the second information having a value (i.e., 0) different from the first value may indicate that the current layer has a plurality of direct reference layers. In this case, encoding (and signaling) of the layer index may not be skipped.

Meanwhile, when the current entry is not the ILRP entry ('NO' in S1610) or when the current layer does not have a plurality of direct reference layers ('NO' in S1620), coding (and signaling) (S1630) of the layer index of the current entry may be skipped.

Figure 17:
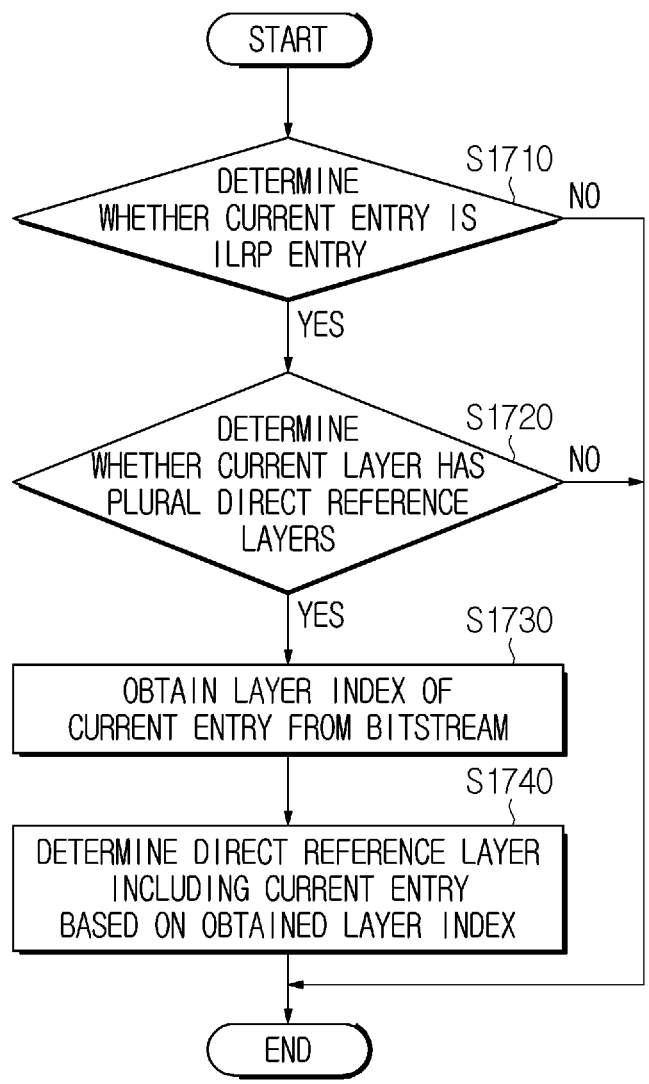
FIG. 17 is a flowchart illustrating an image decoding method according to an embodiment of the present disclosure.

FIG. 17 is a flowchart illustrating an image decoding method according to an embodiment of the present disclosure.

The image decoding method of FIG. 17 may be performed by the image decoding apparatus of FIG. 3 or FIG. 5. For example, steps S1710 to S1740 may be performed by the intra predictor 265 or the predictor 530-1.

Referring to FIG. 17, the image decoding apparatus may determine whether a current entry in a reference picture list structure (e.g., ref_pic_list_struct(listIdx, rplsIdx) is an inter-layer reference picture (IRLP) entry (S1710).

In an embodiment, whether the current entry is the ILRP entry may be determined based on inter_layer_ref_pic_flag [listIdx][rplsIdx][i] obtained from a bitstream. For example, when inter_layer_ref_pic_flag[listIdx][rplsIdx][i] has a first value (e.g., 1), it may be determined that the current entry is the ILRP entry. On the contrary, when inter_layer_ref_pic_flag[listIdx][rplsIdx][i] has a second value (e.g., 0), it may be determined that the current entry is the ILRP entry.

When the current entry is the ILRP entry ('YES' in S1710), the image decoding apparatus may determine whether the current layer including the current picture has a plurality of direct reference layers. (S1720).

In an embodiment, whether the current layer has a plurality of direct reference layers may be determined based on first information (e.g., NumDirectRefLayers[GeneralLayerIdx[nuh_layer_id]]) derived based on whether each layer in a current video sequence is a direct reference layer for the current layer.

In an embodiment, based on inter-layer prediction being allowed for a current video sequence, whether the current layer has a plurality of direct reference layers may be determined based on second information (e.g., sps_num_direct_reference_layers_minus1, sps_ref_layer_idx_plus1 or sps_ref_layer_id_plus1) obtained from the sequence parameter set (SPS). For example, as the second information, sps_num_direct_reference_layers_minus1 may indicate the number of direct reference layers referenced by pictures in the current video sequence. In addition, as the second information, sps_ref_layer_idx_plus1 minus 1 may indicate a layer index of a direct reference layer referenced by pictures in a coded layer video sequence (CLVS). sps_ref_layer_idx_plus1 having a value equal to 0 may indicate that more than one direct reference layer referenced by pictures in the CLVS is present. In addition, as the second information, sps_ref_layer_id_plus1 may indicate a layer Id (e.g., nuh_layer_id) instead of the layer index of the direct reference layer. Except for this, the semantics of sps_ref_layer_id_plus1 may be equal to those of sps_ref_layer_idx_plus1.

When the current layer has a plurality of direct reference layers ('YES' in S1720), the image decoding apparatus may acquire the layer index (e.g., ilrp_idx [listIdx] [rplsIdx] [i]) of the current entry for the direct reference layer list from the bitstream (S1730). Then, the image decoding apparatus may determine the direct reference layer including the current entry based on the layer index (S1740). On the other hand, based on the current layer not having a plurality of direct reference layers, the obtaining of the layer index may be skipped.

In an embodiment, based on the reference picture list structure being present in a sequence parameter set (SPS), the layer index may be obtained from the bitstream regardless of whether the current layer has a plurality of direct reference layers. Whether the reference picture list structure is present in the SPS may be determined based on whether the index value (e.g., rplsIdx) of the reference picture list structure may be less than the number of reference picture list structures in the SPS (e.g., sps_num_ref_pic_lists[listIdx]). For example, when rplsIdx is less than sps_num_ref_pic_lists[listIdx], the reference picture list structure may be present in the SPS. On the other hand, when rplsIdx is equal to sps_num_ref_pic_lists[listIdx], the reference picture list structure may not be present in the SPS.

In an embodiment, the second information (e.g., sps_ref_layer_idx_plus1 or sps_ref_layer_id_plus1) having a first value indicating the layer index of the direct reference layer referenced by pictures in the current video sequence, the obtaining of the layer index may be skipped. Here, the first value may mean a non-zero positive integer. For example, when the value of sps_ref_layer_idx_plus1 is 2, a layer index value of a direct reference layer referenced by pictures in a coded layer video sequence (CLVS) is 1 and the obtaining of the layer index may be skipped. On the other hand, the second information having a value (i.e., 0) different from the first value may indicate that the current layer has a plurality of direct reference layers. In this case, the obtaining of the layer index may not be skipped.

In an embodiment, based on the obtaining of the layer index being skipped, the layer index may be set to the same value (e.g., DirectRefLayerIdx[GeneralLayerIdx[nuh_layer_id]][0]) as the layer index of the direct reference layer of the current layer.

Meanwhile, when the current entry is not the ILRP entry ('NO' in S1710) or when the current layer does not have a plurality of direct reference layers ('NO' in S1720), the obtaining of the layer index of the current entry (S1730) and determination of the direct reference layer (S1740) may be skipped.

According to the image encoding/decoding method according to an embodiment of the present disclosure described above with reference to FIGS. 16 and 17, when inter-layer information is present (e.g., inter_layer_ref_pic_flag[listIdx][rplsIdx][i] 1), a layer index (e.g., ilrp_idx [listIdx][rplsIdx][i]) for a direct reference layer list of an ILRP may be signaled only when the number of direct reference layers (that is, reference layers in the direct reference layer list) is greater than 1. Alternatively, the layer index for the direct reference layer list of the ILRP may be signaled only when a reference picture list structure (e.g., ref_pic_list_struct(listIdx, rplsIdx)) is present in the SPS or when the number of direct reference layers is greater than 1. In each case, a new syntax element indicating the number of direct reference layers may be coded (and signaled) in the SPS. Therefore, it is possible to further improve signaling efficiency of ilrp_idx[listIdx][rplsIdx][i]. In addition, it is possible to remove the parsing dependency for the VPS of the SPS that may occur in the parsing process of ilrp_idx [listIdx][rplsIdx][i].

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 18:
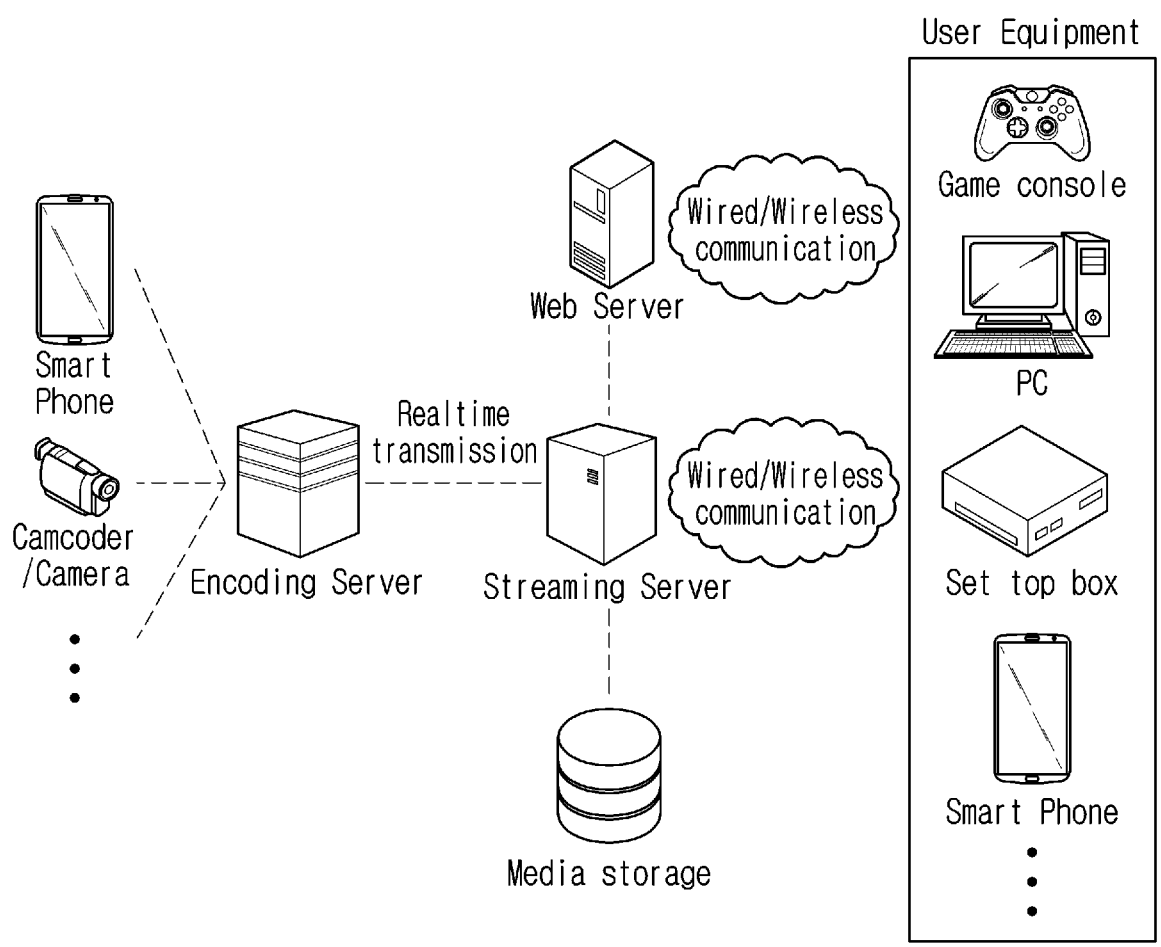
FIG. 18 is a view showing a content streaming system, to which an embodiment of the present disclosure is applicable.

FIG. 18 is a view showing a content streaming system, to which an embodiment of the present disclosure is applicable.

As shown in FIG. 18, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

What is claimed is:

1. An image decoding method performed by an image decoding apparatus, the image decoding method comprising:
    determining whether a current entry in a reference picture list structure is an inter-layer reference picture (ILRP) entry;
    determining whether a current layer including a current picture has a plurality of direct reference layers, based on the current entry being the ILRP entry;
    obtaining a layer index of the current entry for a direct reference layer list from a bitstream, based on the current layer having a plurality of direct reference layers; and
    determining a direct reference layer including the current entry based on the layer index,
    wherein the obtaining of the layer index is skipped based on the current layer not having a plurality of direct reference layers.

2. The image decoding method of claim 1, wherein whether the current layer has a plurality of direct reference layers is determined based on first information derived based on whether each layer in a current video sequence is a direct reference layer for the current layer.

3. The image decoding method of claim 1, wherein, based on the reference picture list structure being present in a sequence parameter set (SPS), the layer index is obtained from the bitstream regardless of whether the current layer has a plurality of direct reference layers.

4. The image decoding method of claim 3, wherein whether the reference picture list structure is present in the SPS is determined based on whether an index value of the reference picture list structure is less than the number of reference picture list structures in the SPS.

5. The image decoding method of claim 1, wherein whether the current layer has a plurality of direct reference layers is determined based on second information obtained from a sequence parameter set (SPS) based on inter layer prediction being allowed for a current video sequence.

6. The image decoding method of claim 5, wherein the second information indicates the number of direct reference layers referenced by pictures in the current video sequence.

7. The image decoding method of claim 5, wherein the obtaining of the layer index is skipped based on the second information having a first value indicating a layer index of a direct reference layer referenced by pixels in the current video sequence.

8. The image decoding method of claim 1, wherein the layer index is set to the same value as a layer index of a direct reference layer of the current layer, based on the obtaining of the layer index being skipped.

9. An image decoding apparatus comprising a memory and at least one processor,
    wherein the at least one processor is configured to:
    determine whether a current entry in a reference picture list structure is an inter-layer reference picture (ILRP) entry;
    determine whether a current layer including a current picture has a plurality of direct reference layers, based on the current entry being the ILRP entry;
    obtain a layer index of the current entry for a direct reference layer list from a bitstream, based on the current layer having a plurality of direct reference layers; and
    determine a direct reference layer including the current entry based on the layer index,
    wherein the obtaining of the layer index is skipped based on the current layer not having a plurality of direct reference layers.

10. An image encoding method performed by an image encoding apparatus, the image encoding method comprising:
    determining whether a current entry in a reference picture list structure is an inter-layer reference picture (ILRP) entry;
    determining whether a current layer including a current picture has a plurality of direct reference layers, based on the current entry being the ILRP entry; and
    encoding a layer index of the current entry for a direct reference layer list, based on the current layer having a plurality of direct reference layers,
    wherein encoding of the layer index is skipped based on the current layer not having a plurality of direct reference layers.

11. The image encoding method of claim 10, wherein, based on the reference picture list structure being present in a sequence parameter set (SPS), the layer index is encoded regardless of whether the current layer has a plurality of direct reference layers.

12. The image encoding method of claim 10, wherein second information indicating whether the current layer has a plurality of direct reference layers is encoded in a sequence parameter set (SPS) based on inter layer prediction being allowed for a current video sequence.

13. The image encoding method of claim 12, wherein the second information indicates the number of direct reference layers referenced by pictures in the current video sequence.

14. The image encoding method of claim 12, wherein encoding of the layer index is skipped based on the second information having a first value indicating a layer index of a direct reference layer referenced by pictures in the current video sequence.

* * * * *